US012338845B2

(12) United States Patent
Schiesser

(10) Patent No.: US 12,338,845 B2
(45) Date of Patent: Jun. 24, 2025

(54) UNIVERSAL ACTUATOR VALVE SYSTEMS AND METHODS THEREOF

(71) Applicant: Mark Schiesser, Ontario, NY (US)

(72) Inventor: Mark Schiesser, Ontario, NY (US)

( * ) Notice: Subject to any disclaimer, the term of this patent is extended or adjusted under 35 U.S.C. 154(b) by 0 days.

(21) Appl. No.: 17/351,412

(22) Filed: Jun. 18, 2021

(65) Prior Publication Data

US 2021/0310501 A1 Oct. 7, 2021

Related U.S. Application Data

(63) Continuation of application No. 15/701,532, filed on Sep. 12, 2017, now abandoned.

(51) Int. Cl.
*F15B 9/09* (2006.01)

(52) U.S. Cl.
CPC .................................... *F15B 9/09* (2013.01)

(58) Field of Classification Search
CPC ................ F15B 21/02; F15B 2211/327; F15B 2211/6656; F15B 2211/3057
See application file for complete search history.

(56) References Cited

U.S. PATENT DOCUMENTS 4,901,625 A * 2/1990 Bussan ................ G05B 19/231 91/361
6,755,115 B2 * 6/2004 Stoll ..................... F15B 15/202 91/363 R

* cited by examiner

*Primary Examiner* — Kenneth Bomberg
*Assistant Examiner* — Daniel S Collins
(74) *Attorney, Agent, or Firm* — Troutman Pepper Locke LLP

(57) ABSTRACT

A system initiates a start of at least one of a flow of a fluid into one section of an actuator or an exhaust of the fluid from another section of the actuator to move a piston from a current to a destination position. The system also initiates a stop of at least one of the flow of the fluid into the one section of the actuator or the exhaust of the fluid from the another section of the actuator no later than when the current position is at the destination position and before at least one of: a pressure of the fluid within the one section is the same as the pressure of the fluid in a fluid line providing the fluid; or pressure of the fluid within the another section is the same as the pressure of the fluid at an end of an exhaust line exhausting the fluid.

4 Claims, 13 Drawing Sheets

10

UNIVERSAL ACTUATOR VALVE SYSTEMS AND METHODS THEREOF

This is a continuation application of U.S. application Ser. No. 15/701,532, filed Sep. 12, 2017, which is hereby incorporated by reference in its entirety.

FIELD

This technology generally relates to valves for use in controlling an actuator and, more particularly, to pneumatic valves that can perform universal control functions with a minimum of energy and compressed air usage.

BACKGROUND

Pneumatic actuators, consisting of a cylinder, a piston, a piston rod (or rod-less cylinder), ports in the cylinder, piston position sensors, valves having solenoids, and controlling logic, have changed little over the past several decades. For example, the type of valve used in the actuator depends on the specific function of the actuator, leading to a large number and type of valves being offered in the marketplace. Further, the programming of the controlling logic also varies depending on the specific function of the actuator. These deficiencies lead to significant engineering time in which the appropriate valves must be selected for a given actuator for a given application, and significant programming time in which the logic is programmed to affect given valve and actuator functions. Additionally, as will be seen later, the inefficient use of compressed air within the cylinder and air lines of current-art pneumatic actuators leads to unnecessary energy costs.

Referring to FIG. 1, an actuator system 10 found in the prior art is illustrated. The prior art actuator 10 system consists of a cylinder 40 containing a piston 36 coupled to a piston rod 38 which is coupled to a mechanical component (not shown) whose motion is to be precisely controlled by the actuator system 10. Actuator system 10 also includes a programmable logic controller (PLC) 20 that has electronic outputs coupled to the inputs of solenoid 22 and solenoid 26, and also has electronic inputs from the outputs of piston position sensor 42 and piston position sensor 44. Solenoid 22 and solenoid 26 are coupled to valve 24, and, under the control of the PLC 20, act cooperatively to control the valve 24. Valve 24 has two positions and comprises sections, namely left valve section 23 and right valve section 25, although valve 24 can be any type of valve and have a variety of positions used to control the flow of air to and from the cylinder 40. Common valve types are 5/2 single solenoid, 5/3 double solenoid, 5/3 open center, 5/3 blocked center, and 5/3 pressurized center, where the second digit (either 2 or 3) indicates the number of valve positions, and the first digit (the 5) is the total number of ports on the valve. Note that valve types other than these five common types can be found in the market, although these five types account for nearly 98% of the valves actually used in industry.

Valve 24 is coupled to cylinder port 32 through air line 31, and cylinder port 34 is coupled to valve 24 through air line 33. Valve 24 also is coupled to a source of compressed air (not shown) through air line 28, and valve 24 also has exhaust lines 30A and 30B which are used to exhaust unneeded compressed air to the atmosphere. Depending on which solenoid was energized last, either left valve section 23 or right valve section 25 will be coupled to air lines 30A, 28, 30B, 31, and 33. If the left valve section 23 is coupled to the air lines (as shown in FIG. 1), then compressed air will flow through air line 28, through left valve section 23 to air line 31 and into cylinder 40 through cylinder port 32, thereby causing piston 36 and piston rod 38 to move to the right. At the same time air will flow from cylinder 40 through cylinder port 34 through air line 33 through left valve section 23 to exhaust line 30B. On the other hand, if the right valve section 25 is coupled to air lines 30A, 28, 30B, 31, and 33 (not shown), then compressed air will flow through air line 28, through right valve section 25 to air line 33 and into cylinder 40 through cylinder port 34, thereby causing piston 36 and piston rod 38 to move to the left. To facilitate the left piston motion, at the same time air will flow from cylinder 40 through cylinder port 32 through air line 31 through right valve section 25 to exhaust line 30A.

An input of the PLC 20 also is coupled to an output of piston position sensor 42 for sensing one end position of the piston 36 within the cylinder 40, and another input of the PLC 20 is coupled to an output of piston position sensor 44 for sensing the other end position of the piston 36 within the cylinder 40.

While the prior art actuator system 10 can be made to operate in a wide variety of scenarios, its operation will be described with reference to FIG. 1 in which the piston 36 moves in a simple out then in motion. Assuming the piston 36 is in the full-in (i.e., fully withdrawn or retracted) position within the cylinder 40, and the right valve section 25 coupled to or engaged with air lines 30A, 28, 30B, 31, and 33, the PLC 20 energizes solenoid 22 which in turn causes the valve 24 to move such that left valve section 23 is now coupled to air lines 30A, 28, 30B, 31, and 33 as shown in FIG. 1. When this occurs, compressed air flows through line 28 through the left valve section 23 into air line 31 and into cylinder 40 through cylinder port 32. At the same time compressed air leaves cylinder 40 through cylinder port 34 and air line 33 through left valve section 23 and is exhausted to the atmosphere through exhaust line 30B. This movement of compressed air into and out of cylinder 40 causes the piston 36 and piston rod 38 to move to the right.

When the piston 36 reaches its nominal rightmost position, piston position sensor 42 sends a signal to the PLC 20 indicating it has reached its advanced position and that the PLC 20 can commence its next programmed operation accordingly. At this time solenoid 22 also is de-energized by the PLC 20. Note that piston 36 may reach its fully advanced position even though the pressure of the air within left cylinder section 45 has not reached the pressure of the compressed air entering the valve 24 through compressed air line 28. Further, piston 36 may reach its fully advanced position even though the pressure of the air within right cylinder section 43 has not fallen to the pressure of the atmospheric air that air line 30B exhaust into.

After some time period has elapsed, or when other inputs (not shown) to the PLC indicate that the piston 36 and piston rod 38 must be retracted, the PLC energizes solenoid 26 which causes the valve 24 to move such that right valve section 25 is now engaged with air lines 30A, 28, 30B, 31, and 33. When this occurs compressed air flows through line 28 through the right valve section 25 into air line 33 and into the right cylinder section 43 of cylinder 40 through cylinder port 34. At the same time compressed air leaves left cylinder section 45 of cylinder 40 through cylinder port 32 and air line 31 through right valve section 25 and is exhausted to the atmosphere through exhaust line 30A. This movement of compressed air into the right cylinder section 43 and out of left cylinder section 45 of cylinder 40 causes the piston 36 and piston rod 38 to move to the left.

When the piston 36 reaches its nominal leftmost position, piston position sensor 44 sends a signal to the PLC 20 indicating it has reached its retracted position and that the PLC 20 can commence its next programmed operation accordingly. At this time solenoid 26 also is de-energized by the PLC 20. Note that piston 36 may reach its fully retracted position even though the pressure of the air within right cylinder section 43 has not reached the pressure of the compressed air entering the valve 24 through compressed air line 28. Further, piston 36 may reach its fully retracted position even though the pressure of the air within left cylinder section 45 has not fallen to the pressure of the atmospheric air that air line 30A exhausts into.

While the operation of the prior-art actuation system 10 is straightforward and seemingly efficient, in actuality there are several subtleties that impart significant design, assembly, and operating costs that detract from its utilization. Design costs arise from 1) the detailed programming of the PLC 20, 2) valve selection (determining which of the five commonly used valve types is most suitable), 3) sizing (determining the optimal diameter of the valve and valve ports as a function of cost and air-flow), and 4) valve locating (determining where to locate a valve and, optionally, valve manifold as a function of accessibility, ease of assembly, air-line length, and cost).

Increased assembly costs arise from the need to follow a plumbing or air-line diagram, keeping track of the plumbing lines, and organizational overhead to ensure the correct valve is plumbed to the correct port of the correct cylinder, which can be challenging because often the valve can be several meters away from its cylinder. Similarly, increased assembly costs arise from the need to follow an electrical schematic or wiring diagram, keeping track of the wires and buses, and organizational overhead to ensure the correct terminal of the PLC is connected to the correct solenoid of the correct valve, which can be challenging because often the PLC can be several meters away from the valve.

Operating costs arise primarily from the use of compressed air and the cost of electrical power needed to produce that compressed air. For example, at $0.06/kilowatt-hour it costs $1.22/hour to produce 100 SCFM of compressed air.

The design and assembly costs can be significantly reduced by utilizing just one universal valve instead of the five common valve types mentioned above so the engineering effort is reduced and valve economies of scale are realized, and locating the universal valve at the cylinder port(s) it is coupled to save assembly costs (e.g., no need to keep track of which valve is connected to which port several meters away) and engineering costs (e.g., no need to determine the necessary valve diameter because the valve diameter simply becomes the diameter of the cylinder port it is attached onto).

However, a significant drawback to the prior-art actuator system 10 is the operational costs arising from the inefficient use of compressed air, in particular the cost of the electrical power needed to compress the air, needed to operate the actuator system 10. There are at least two ways in which the prior art actuator system utilizes the compressed air inefficiently and needlessly drives up the electrical power consumption costs.

The first inefficiency is due to the need to compress and exhaust the air in air lines 31 and 33 as part of the actuator operation as described above. As an example, if air lines 31 and 33 have an inner diameter of 0.375", and a length of 15', then their volume is 0.0115 ft2 each. If actuator 10 operates at a rate of 30 cycles/minute then each of air lines 31 and 33 consumes 0.345 ft2/minute (CFM).

The second inefficiency is caused by the fact that compressed air continues to flow into either left cylinder section 45 or right cylinder section 43 (and correspondingly exhausted from either right cylinder section 43 or left cylinder section 45, respectively) even though the piston 36 may have reached its terminal position. This additional flow of compressed air into the cylinder 40 is unnecessary and leads unnecessary electrical costs associated with compressing the additional air.

Further, the additional exhausting is unnecessary and can be halted without affecting the performance of the actuator 10. If the exhausting is indeed stopped when the piston 36 reaches its terminal position, then less compressed air will be needed to refill the exhausted portion of the cylinder 40 during the next stroke of the piston 36, which offers an additional efficiency gain in the utilization of compressed air and corresponding cost savings.

SUMMARY

An actuator system has at least one of configurable hardware logic configured to implement or one or more processors configured to be capable of executing programmed instructions comprising and stored in a memory. The instructions comprise initiating a start of at least one of a flow of a fluid into one section of an actuator or an exhaust of the fluid from another section of the actuator to move a piston from a current position towards a destination position. The instructions also comprise initiating a stop of at least one of the flow of the fluid into the one section of the actuator or the exhaust of the fluid from the another section of the actuator no later than when the current position is at the destination position and before at least one of: a pressure of the fluid within the one section is the same as the pressure of the fluid in a fluid line providing the fluid; or pressure of the fluid within the another section is the same as the pressure of the fluid at an end of an exhaust line exhausting the fluid.

A method implemented by at least one of configurable hardware logic configured to implement or one or more processors configured to be capable of executing programmed instructions comprising and stored in a memory includes initiating a start of at least one of a flow of a fluid into one section of an actuator or an exhaust of the fluid from another section of the actuator to move a piston from a current position towards a destination position. A stop of at least one of the flow of the fluid into the one section of the actuator or the exhaust of the fluid from the another section of the actuator is initiated no later than when the current position is at the destination position and before at least one of: a pressure of the fluid within the one section is the same as the pressure of the fluid in a fluid line providing the fluid; or pressure of the fluid within the another section is the same as the pressure of the fluid at an end of an exhaust line exhausting the fluid.

Accordingly, the claimed technology provides a number of advantages including lower design costs, lower assembly costs, and lower operating costs due to its improved design and more efficient use of compressed air. With the claimed technology, these lower costs may be obtained, by way of example, by including: universal valves that are mounted directly onto the cylinder port whose air-flow the valves are controlling; a universal valve controller co-located or integrated with the valve that it is controlling; a continuous piston position sensor at the cylinder; and/or a learning algorithm within the controller that can adapt to and anticipate the motion of the piston within the actuator in order to precisely control the flow of compressed air and minimize the total amount of compressed air used to effect an actuation.

Additionally, with the claimed technology the lower design costs may be reduced, by way of example, by: simplified programming of the host computer or PLC; elimination of any need to determine which of the several standard valve types is optimal as there is only one universal valve to use; elimination of any need to determine diameters of any valve port and air line because the diameters are simply the same as the diameter of the cylinder ports; and/or reduction in compressed air consumption by eliminating the air lines between the valve and the cylinder, and by the more precise and efficient control of the air pressure within the two sections of the cylinder.

DETAILED DESCRIPTION

Figure 1:
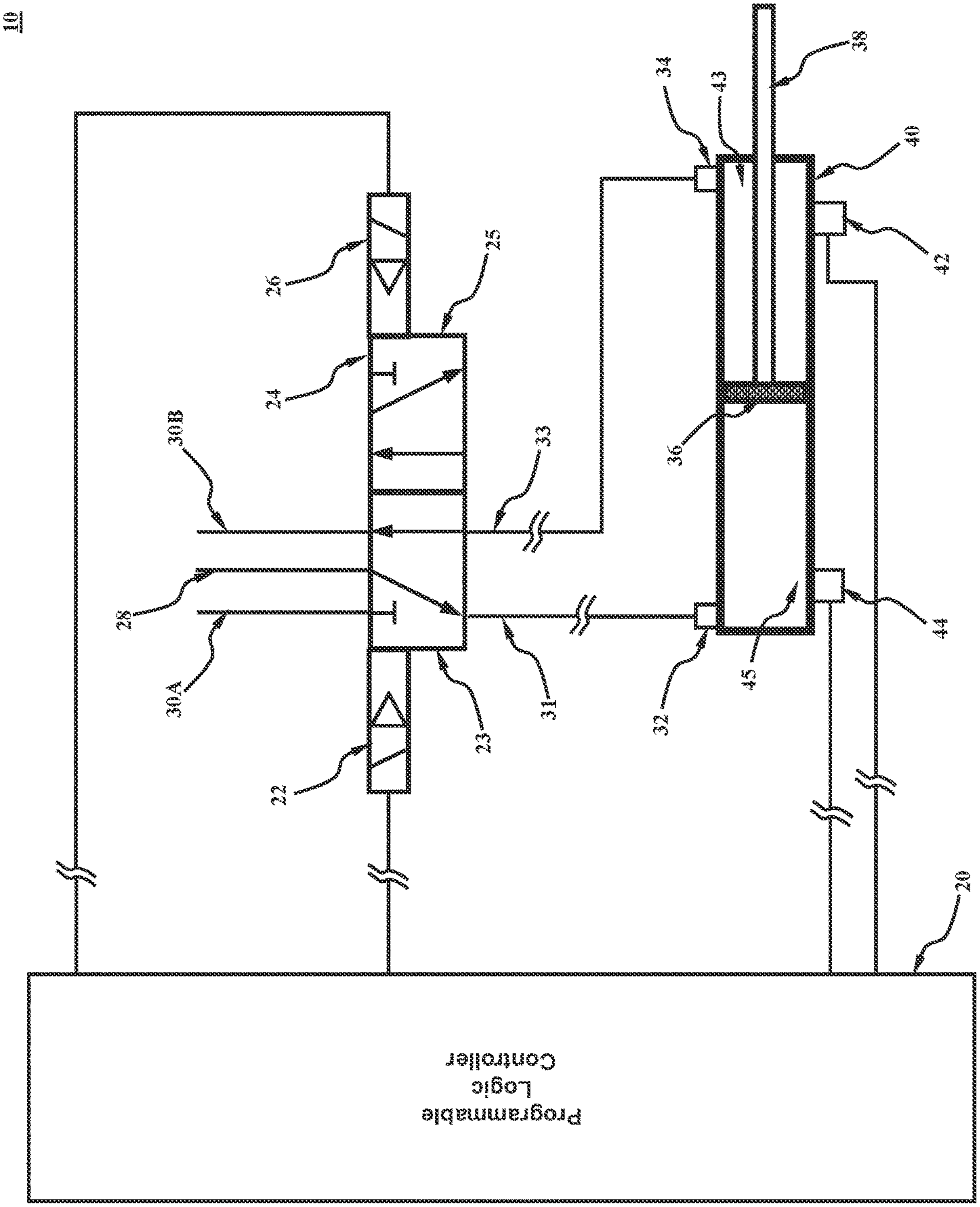
Fig. 1 (Prior Art)
FIG. 1 is a diagram of a prior art actuator system.
Figure 2:
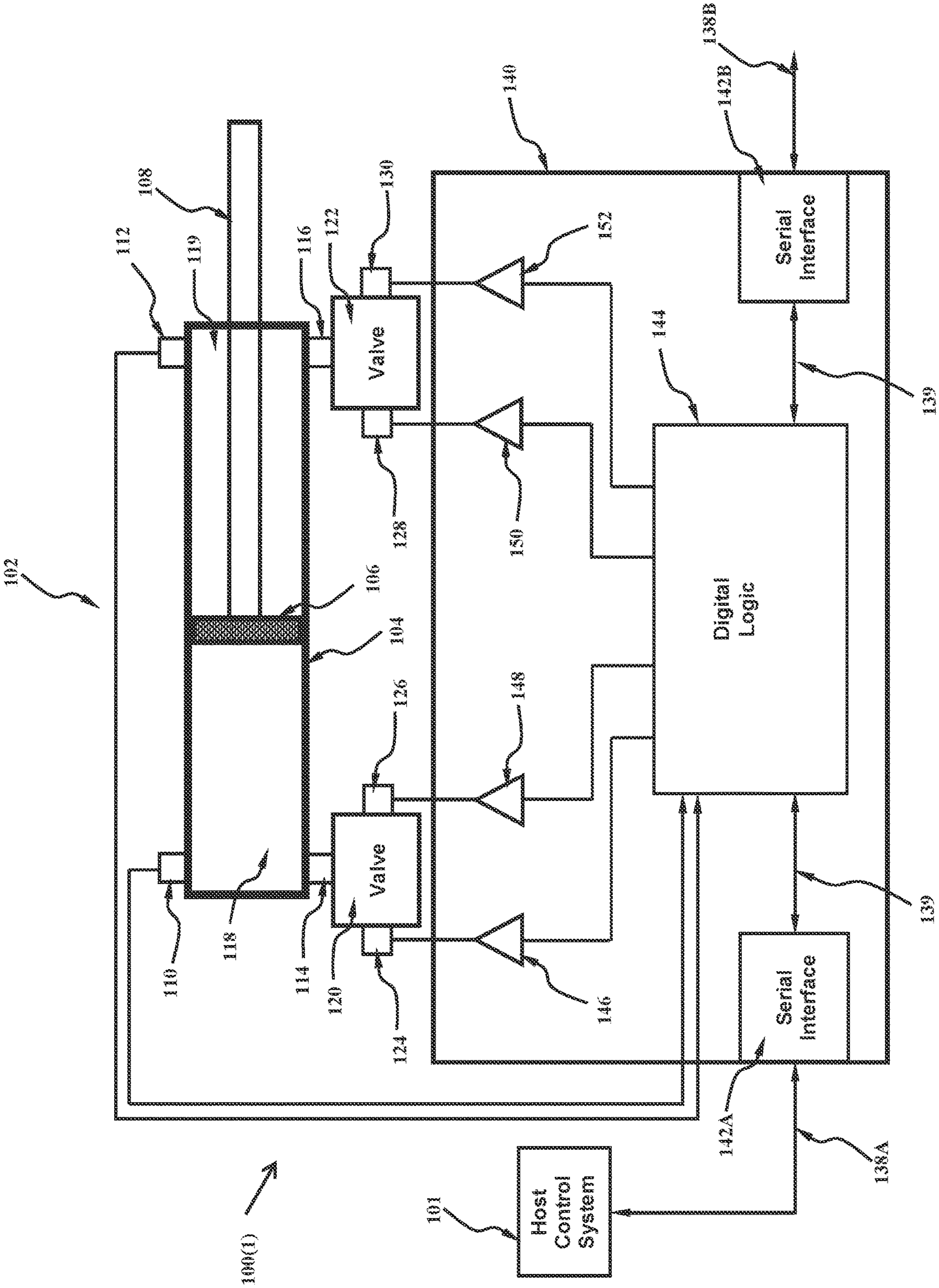
FIG. 2 is a diagram of an example of an actuator system incorporating universal valves.

An example of a directional control valve system 100(1) is illustrated in FIG. 2. In this particular example, the directional control valve system 100(1) includes an actuator 102, universal valves 120 and 122, a universal controller 140, a host control system 101, and position sensors 110 and 112, although the system could have other types and/or numbers of other systems, devices, components and/or other elements in other configurations, such as in the examples illustrated in FIGS. 4, 6, and 12. The examples herein are described as operating with a gas, such as air, although other types of fluids may be used, such as hydraulic fluid or other liquids. With respect to the examples described herein, the term “air” can be used interchangeably with other terms, such as “gas”, “pneumatic”, “liquid” and “fluid”. Additionally, with the examples herein, the energy-saving benefits with this technology are generally limited to those examples operating with compressible fluids. Accordingly, as illustrated and described by way of the examples herein, the claimed technology provides a number of advantages including lower design costs, lower assembly costs, and lower operating costs due to its improved design and more efficient use of compressed air Referring more specifically to FIG. 2, the actuator 102 has a cylinder 104 containing a piston 106 which is coupled to a piston rod 108 which in turn is coupled to a mechanical component (not shown) whose motion is to be controlled by the universal controller 140, although other types of actuators with other types and/or numbers of other systems, devices, components and/or other elements in other configurations can be used. The cylinder 104 in this example has a cylindrical shape, although the cylinder 104 could have other shapes, such as square, rectangular, hexagonal, octagonal, or elliptical cross-sectional shapes by way of example. Additionally, in this example the cylinder 104 has a left cylinder section 118 (to the left of the piston 106) and a right cylinder section 119 (to the right of piston 106) which are both nominally air-tight and can be filled with a compressed gas, such as air by way of example, or exhausted as needed to cooperatively cause the piston 106 to move to the left or right within cylinder 104. Further, the cylinder 104 is coupled to a port 114 associated with the left cylinder section 118 and through which air can flow into or out of the left cylinder section 118 as needed. The cylinder 104 also is coupled to the port 116 associated with the right cylinder section 119 and through which air can flow into or out of the right cylinder section 119 as needed, although other types and/or numbers of ports or other outlets can be coupled to or otherwise formed with the cylinder 104.

The piston 106 comprises a cylindrical disk which is slidably seated within the cylinder 104 to move or compress a fluid, although other types of parts with other shapes that mate with the cross-sectional shape of the cylinder or other chamber may be used. The movement of the piston 106 to the full right position is herein referred to as an advanced or extended position, while the movement of the piston 106 to the full left position is referred to as a withdrawn or retracted position.

The piston rod 108 exits through one end (or both ends) of the cylinder 104, although other manners for moving the piston 106 in the cylinder 104 can be used. By way of example only, a rod-less system in which the piston 106 is mechanically coupled to a mechanical linkage that exits through a side wall of cylinder 104 could be used.

Figure 3:
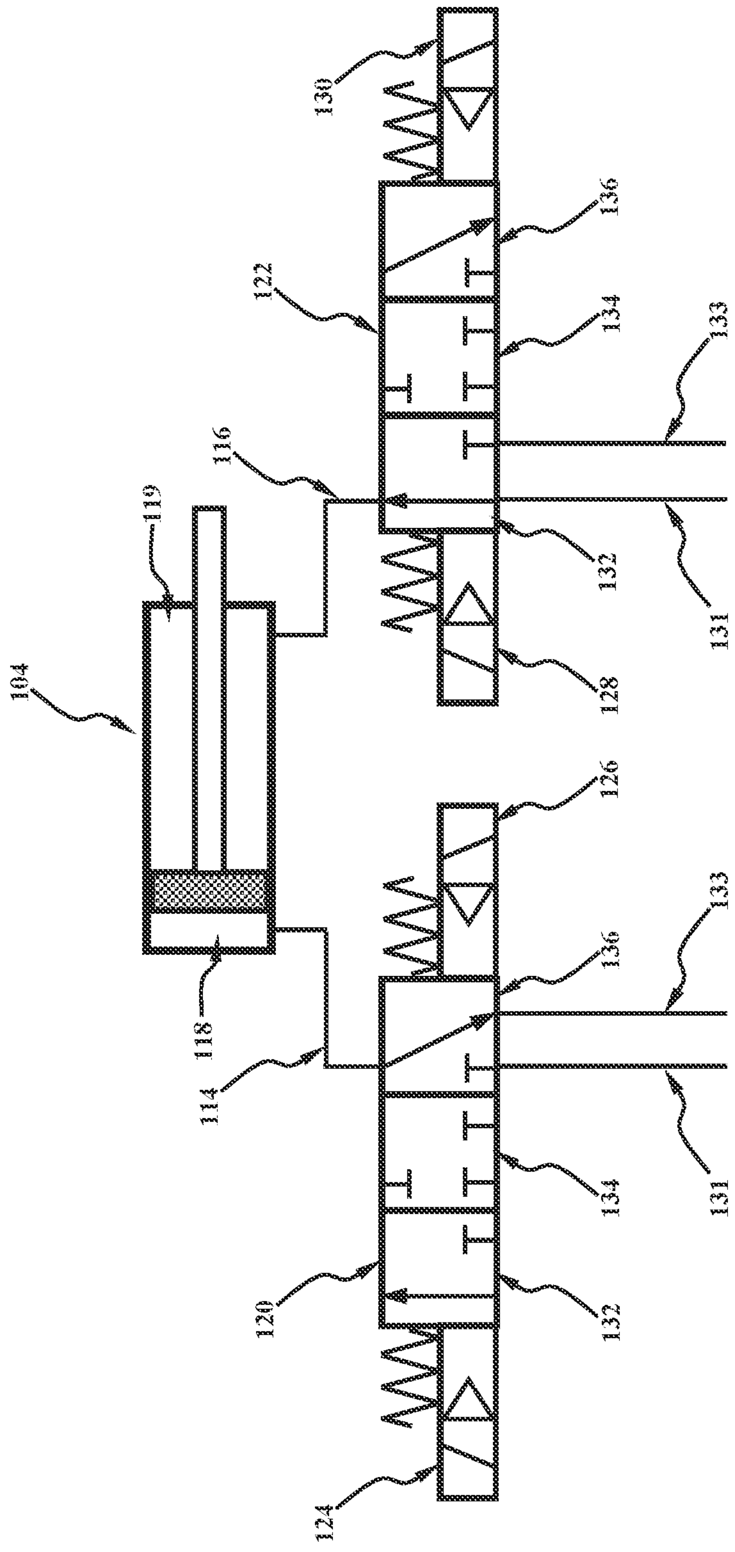
FIG. 3 is a functional diagram of a pair of universal valves used to control a position of a piston within a cylinder.

Referring to FIGS. 2 and 3, the two universal valves 120 and 122 are coupled to the actuator 102, although other types and/or numbers of valves may be coupled to the actuator. In this example, the universal valves 120 and 122 are identical in structure and operation, except as otherwise illustrated or described herein, although each could have other structure and/or operation. Additionally, each of the universal valves 120 and 122 is a 3/3 blocked center valve having three positions and comprising three sections with three ports, although other types and/or numbers of universal or other valves could be used.

More specifically, in this particular example the universal valve 120 has solenoids 124 and 126 coupled to a moveable valve body comprising the three sections: a fill valve section 132; a block valve section 134; and an exhaust valve section 136 where each of these sections can be coupled to three ports comprising: a compressed air line 131; an exhaust air line 133; and the port 114 to effect the desired flow of air, although the universal valve could have other types and/or numbers of other systems, devices, components and/or other elements in other configurations. Similarly, the universal valve 122 has solenoids 128 and 130 coupled to a moveable valve body comprising the three sections: a fill valve section 132; a block valve section 134; and an exhaust valve section 136 where each of these sections can be coupled to three ports comprising: a compressed air line 131; an exhaust air line 133; and the port 116 to effect the desired flow of air, although the universal valve could have other types and/or numbers of other systems, devices, components and/or other elements in other configurations.

In this example, the solenoids 124, 126, 128, and 130 are identical in structure and operation, except as otherwise illustrated or described herein, although each could have other structure and/or operation. The solenoids 124, 126, 128, and 130 are configured to convert an electronic signal produced by the solenoid drivers 146, 148, 150, and 152 into a linear mechanical motion in which the fill valve section 132, the block valve section 134, and the exhaust valve section 136 are slid past or through a manifold of the universal valve 120 and/or 122 containing the compressed air line 131, the exhaust air line 133, and the port 114 or 116. In this way the fill valve section 132, the block valve section 134, and the exhaust valve section 136 of the universal valves 120 and/or 122 can be made to couple with the compressed air line 131, the exhaust air line 133, and port 114 or 116, as needed to affect the desired flow of air or other fluid.

The universal valves 120 and 122 can act independently or act cooperatively under the control of the digital logic until 144 of controller 140, to affect any valve function, although the universal valves can be controlled by other types and/or numbers of devices. Additionally, the universal valves 120 and 122 may, by way of example only, effect five common valve functions, such as those effected by a 5/2 single solenoid valve, a 5/3 double solenoid valve, a 5/3 open center valve, a 5/3 blocked center valve, or a 5/3 pressurized center as illustrated and described later with reference to FIGS. 7A-11B.

An understanding of the terminology used herein to describe the position of the universal valves 120 and 122 is necessary to understand the operation of the universal valves 120 and 122. When referring to one of the universal valves 120 and 122 as being in its "left-most" position means that the fill valve section 132, block valve section 134, and the exhaust valve section 136, which are mechanically coupled to form a unitary body, is 'slid' to its left-most position relative to air lines 131 and 133, and ports 114 and 116. For example, the universal valve 120 is shown to be in its left-most position in FIG. 3, even though its right-most exhaust valve section 136 is engaged with the air-lines 131 and 133, and the port 114. Similarly, the universal valve 122 is shown to be in its right-most position in FIG. 3, even though its left-most valve section 132 is engaged with the air-lines 131 and 133, and the port 116.

When the fill valve section 132 of the universal valve 120, is placed in a position by the solenoids 124 and 126 such that its three ports are connected to the port 114, compressed air line 131, and the exhaust air line 133, then compressed air will flow through compressed air line 131 through the fill valve section 132 and the port 114 into the cylinder 104. At the same time the exhaust air line 133 is blocked. Alternately, when the fill valve section 132 of the universal valve 120 is placed in a position by solenoids 124 and 126 such that its three ports are not connected to any of the port 114, compressed air line 131, and the exhaust air line 133, then no air will flow through the fill valve section 132 and the fill valve section 132 lies outside the air circuit and does not impact the motion of air into or out of cylinder 104.

When block valve section 134 of the universal valve 120 is placed in a position by solenoids 124 and 126 such that its three ports are connected to the port 114, compressed air line 131, and the exhaust air line 133, then the air circuit is configured such that the flow of compressed air through compressed air line 131 is blocked, the flow of the exhaust air through the exhaust air line 133 is blocked, and the flow of air through the port 114 is blocked. Alternately, when block valve section 134 of the universal valve 120 is placed in a position by solenoids 124 and 126 such that its three ports are not connected to any of the port 114, compressed air line 131, and the exhaust air line 133, then block valve section 134 lies outside the air circuit and does not impact the motion of air into or out of cylinder 104.

When the exhaust valve section 136 of the universal valve 120 is placed in a position by the solenoids 124 and 126 such that its three ports are connected to the port 114, compressed air line 131, and the exhaust air line 133, then the air circuit is configured such that compressed air will flow out from cylinder 104 through the port 114 through the exhaust valve section 136 into the exhaust air line 133 and subsequently exhausted to the atmosphere. At the same time compressed air line 131 is blocked. Alternately, when the exhaust valve section 136 of the universal valve 120 is placed in a position by solenoids 124 and 126 such that its three ports are not connected to any of the port 114, compressed air line 131, and the exhaust air line 133, then no air will flow through the exhaust valve section 136 and the exhaust valve section 136 lies outside the air circuit and does not impact the motion of air into or out of cylinder 104.

The preceding discussion of the fill valve section 132, block valve section 134, and the exhaust valve section 136 as related to the universal valve 120 and port 114 in this example also operates in the same manner for the universal valve 122, although the universal valve could be configured and/or operate in other manners.

Referring back to FIG. 2, the universal controller 140 includes the digital logic unit 144, the solenoid drivers 146, 148, 150, and 152, and serial interfaces 142A and 142B, although the universal controller 140 may comprise other types and/or numbers of other systems, devices, components or other elements in other configurations.

Figure 13:
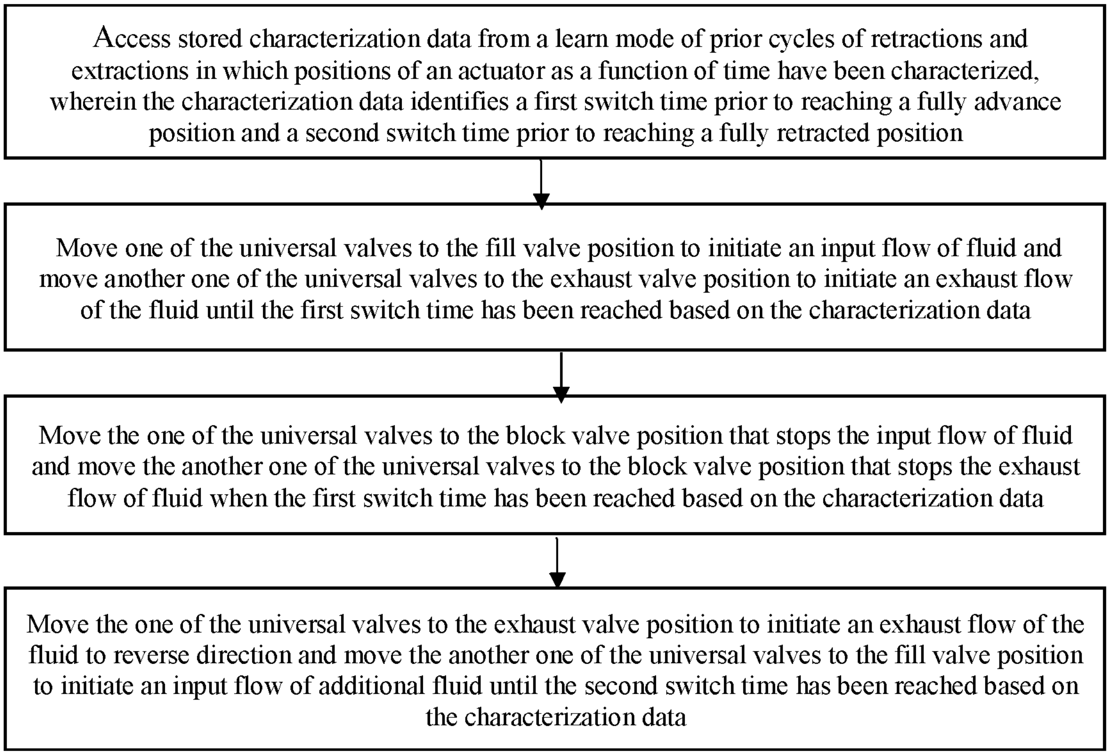
FIG. 13 is a flow chart of an example of programmed instructions for a method for controlling an actuator.

In this example, the digital logic unit 144 is an electronic device, circuit, or circuits that implements a digital logic function as illustrated and described by way of the examples herein, although other types and/or numbers of configurable logic units and/or computing devices configured to execute non-transitory computer readable instructions for operations as illustrated and described by way of the examples herein including FIG. 13 may be used. The digital logic unit 144 also may comprise non-programmable logic devices such as NAND and NOR combinatorial logic gates, for example, which implement a deterministic logic function that cannot be changed once it is assembled, although other types and/or numbers of digital logic may be used. Alternately, the digital logic unit 144 may comprise one or more programmable logic devices such as an FPGA, CPLD, a microprocessor, a microcontroller, or even a DSP. If the digital logic unit 144 is programmable, then the digital logic unit 144 may also contain memory in which to hold the programming instructions, data about the state of the directional control valve system 100(1), and a unique controller address as described below in connection with FIG. 5A. The digital logic unit 144 functions to control the operation of the universal valve 120 and 122, with inputs from a retracted position sensor 110, an advanced position sensor 112, and from the host control system 101 through a serial bus interface 142A. The digital logic unit 144 may function to control the internal operation of actuator 102 at a much finer level of detail than the host control system 101 could efficiently control remotely, allowing for more precise control of the compressed air within the air circuits of the directional control valve system 100(1) so the compressed air is utilized more efficiently and cost-effectively. The operation of the digital logic unit 144 to this end is described in more detail herein. It should be noted that in some examples some or all of the functionality of the digital logic unit 144 can be incorporated into the functionality of host control system 101 instead of being within the universal controller 140.

The digital logic unit 144 also is electronically coupled to a serial bus interface 142A which in turn is connected to an external serial communication bus 138A who function cooperatively to couple a host control system 101 to the digital logic unit 144, although other types of configurations may be used. The host control system 101 can issue commands to the digital logic unit 144 through the external serial communication bus 138A and the digital logic unit 144 can issue status information to the host control system 101 through the external serial communication bus 138A. The digital logic unit 144 can also be electronically coupled to a second serial bus interface 142B which in turn is connected to a second external serial communication bus 138B whose function is to allow digital communications between universal controller 140 and additional downstream universal controllers (not shown in FIG. 2, but shown in FIG. 5A)

The solenoid drivers 146, 148, 150, and 152 are all substantially identical to one another both in their structure and operation, although the drivers can have other structure and/or operation. Additionally, the solenoid drivers 146, 148, 150, and 152 are electronic devices or circuits that each accept as an input a binary digital logic signal from a corresponding digital output from the digital logic unit 144, and power amplify and level shift the input signal to a level sufficient to energize and activate their respective solenoid 124, 126, 128, or 130, although other types and/or numbers of drivers may be used. In this example, the solenoid 124 is electrically coupled to an output of the solenoid driver 146 which has an input which is electrically coupled to an output of the digital logic unit 144, although other manners of coupling to and controlling the solenoid 124 may be used. In this way the operation of the solenoid 124 can be controlled by the digital logic unit 144 through the solenoid driver 146. Similarly, the solenoid 126 is electrically coupled to an output of the solenoid driver 148 which has an input which is electrically coupled to an output of the digital logic unit 144, although other manners of coupling to and controlling the solenoid 124 may be used. In this way the operation of the solenoid 126 can be controlled by the digital logic unit 144 through the solenoid driver 148. Likewise the solenoid 128 is electrically coupled to an output of the solenoid driver 150 which has an input which is electrically coupled to an output of the digital logic unit 144. In this way the operation of the solenoid 128 can be controlled by the digital logic unit 144 through the solenoid driver 150. Lastly the solenoid 130 is electrically coupled to an output of the solenoid driver 152 which has an input which is electrically coupled to an output of the digital logic unit 144. In this way the operation of the solenoid 130 can be controlled by the digital logic unit 144 through the solenoid driver 152.

The serial bus interface 142A is an electronic device or circuit that is a critical component of the electronic circuit that communicates data to and from the digital logic unit 144 from and to (respectively) an external host control system 101. Serial bus interface 142A therefore establishes a two-way bi-directional communication channel between the digital logic unit 144, through internal communication bus 139, and the host control system 101, through the external serial communication bus 138A, and the bi-directional channel can be configured to be half-duplex or full-duplex. Internal communication bus 139 can be a serial or parallel data bus over which digital electronic signals are transmitted. Digital electronic signals are also transmitted through the external serial communication bus 138A or 138B, which can be configured as a CAN bus, USB, Profi bus, DeviceNet, Asi, RS-242, RS-422, Gige, Ethernet, or even a pair of discrete wires.

Similarly, the serial bus interface 142B is an electronic device or circuit that communicates data to and from the digital logic unit 144 from and to (respectively) another universal controller. Serial bus interface 142B therefore establishes a two-way bi-directional communication channel between the digital logic unit 144, through internal communication bus 139, downstream controllers through the external serial communication bus 138B, and the bi-directional channel can be configured to be half-duplex or full-duplex.

The host control system 101 can be implemented as a PLC (Programmable Logic Controller), a microcomputer, microprocessor, an FPGA (Field Programmable Gate Array), a CPLD (Complex Programmable Logic Device), a DSP (Digital Signal Processor), with electro-mechanical relays, or even as discrete or combinatorial logic, although other types of systems, devices, components and/or elements can be used for host control system. By way of example only, the host control system 101 also may comprise a computing device with a central processing unit (CPU) or processor, a memory, and an interface or I/O system, which are coupled together by a bus or other link, although the host control system may comprise other types and/or numbers of other systems, devices, components, and/or other elements in other configurations. The processor may execute one or more computer-executable instructions stored in the memory for operations illustrated and described by way of the examples herein. The processor may comprise one or more central processing units ("CPUs") or general purpose processors with one or more processing cores, such as AMD® processor(s), although other types of processor(s) could be used (e.g., Intel®). The memory may comprise one or more tangible storage media such as, for example, RAM, ROM, flash memory, CD-ROM, floppy disk, hard disk drive(s), solid state memory, DVD, or any other memory storage type or devices, including combinations thereof, which are known to those of ordinary skill in the art. The memory may store one or more computer-readable instructions that may be executed by the one or more processor and/or the digital logic unit 144. When these stored instructions are executed, they may implement processes that are illustrated and described by way of the examples here. In this example, the machine readable instructions may embody an algorithm or computer program for execution by at least one of: (a) one or more processors each having one or more processor cores, (b) hardware specifically configured to perform the instructions (e.g., ASICs, FPGAs) and (c) one or more other suitable processing device(s). The algorithm or computer program may be embodied in software stored on memory by way of example only. Among other possible functions, as illustrated and described by way of the examples herein, the host control system 101 may be responsible for sequencing the operation of the various valves under its control.

Figure 6:
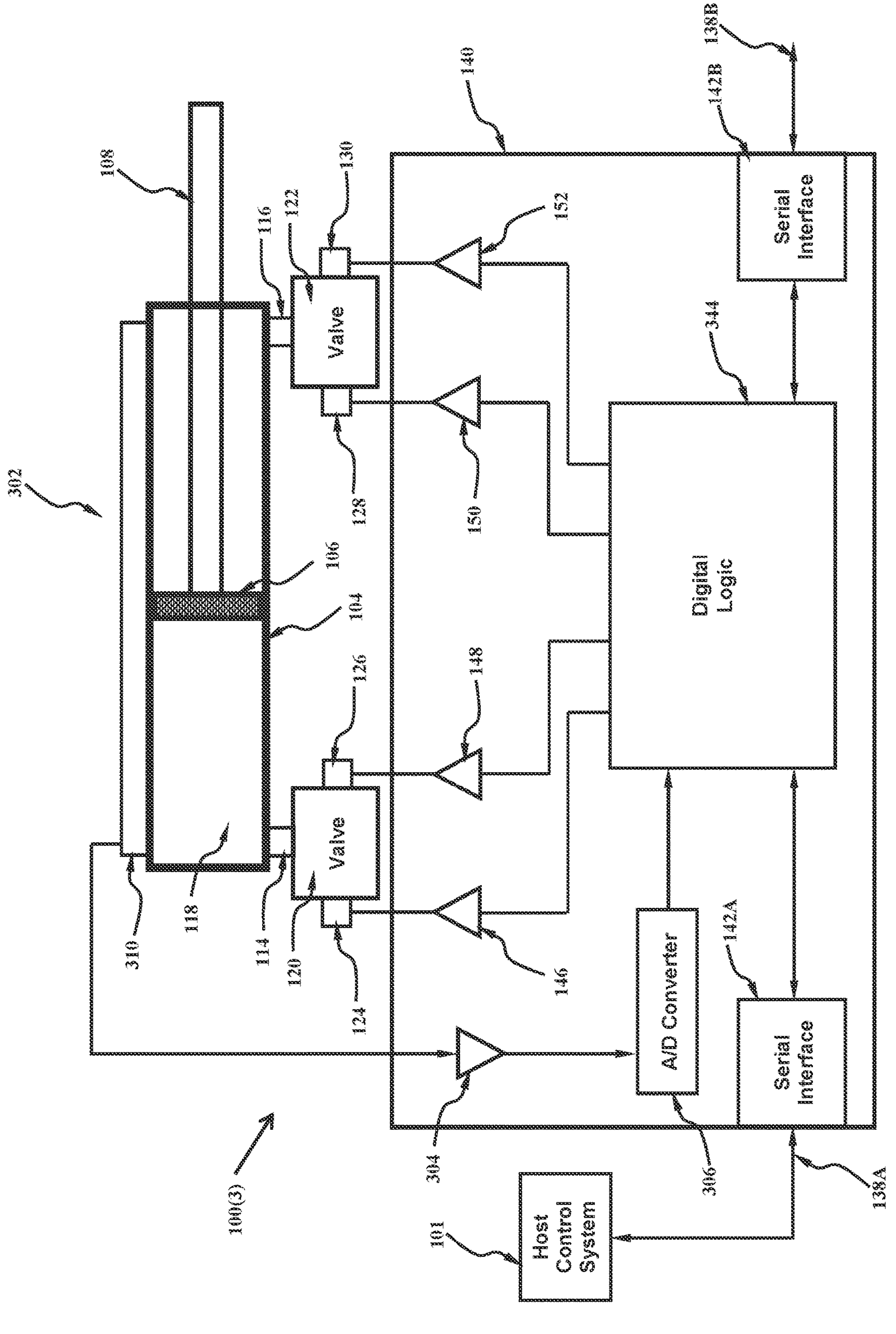
FIG. 6 is a block diagram of an example of another actuator system incorporating universal valves and a continuous piston position sensor.

The retracted position sensor 110 and the advanced position sensor 112 are used to determine a current position of the piston 106 in the actuator 102, although other types and/or numbers of position sensors or other devices may be used, such as continuous position sensor 310 illustrated in the example in FIG. 6 by way of example only. The retracted position sensor 110 is coupled to the cylinder 104 and is activated when the piston 106 reaches its desired retracted position. An output of the retracted position sensor 110 is electronically coupled to an input of the digital logic unit 144 so the processing within the digital logic unit 144 can include knowledge of the retracted position of the piston 106 during its operation. The advanced position sensor 112 also is coupled to the cylinder 104 which is activated when the piston 106 reaches its desired advanced position. An output of the advanced position sensor 112 is electronically coupled to an input of the digital logic unit 144 so the processing within the digital logic unit 144 can include knowledge of the desired advanced position of the piston 106 during its operation.

Although an exemplary directional control valve system 100(1) with the host control system 101 and the digital logic unit 144 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any example. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, 3G/4G/LTE communications networks, Public Switched Telephone Network (PSTNs), Packet Data Networks (PDNs), the Internet, intranets, and combinations thereof.

The examples may also be embodied as a computer readable medium having instructions stored thereon for one or more aspects of the technology as described and illustrated by way of the examples herein, which when executed by a processor and/or configurable hardware, cause the processor and/or configurable hardware to carry out the steps necessary to implement the methods of the examples, as described and illustrated herein.

An example of a method for controlling the actuator 102 in the directional control valve system 100(1) will now be described with reference to FIG. 2 and FIG. 3. In this example the piston 106 is caused to move from the fully retracted position to the fully advanced position and then back to the fully retracted position, although many other operational sequences are possible as well.

In this example, at the start of the operation the universal valve 120 is in its center position in which block valve section 134 is engaged with compressed air line 131, the exhaust air line 133, and the port 114, and the universal valve 122 also is in its center position in which block valve section 134 is engaged with compressed air line 131, the exhaust air line 133, and the port 116, and the piston 106 is in its fully retracted position within the cylinder 104. Note that since both the universal valves 120 and 122 are in their blocked valve positions, no air flows and the piston 106 is substantially locked in its retracted position.

Next, the host control system 101 transmits data through the external serial communication bus 138A to the digital logic unit 144 that is a command for the piston 106 to move to its advanced position. The command passes through the serial bus interface 142A which converts the format of the data and signal of the external communication bus 138A from the bus standard to the digital logic levels of the internal communication bus 139. The command to move the piston 106 to its advanced position then passes through the internal communication bus 139 to the digital logic unit 144. The digital logic unit 144 then receives and parses the command to extend the piston 106. The digital logic unit 144 also has data indicating that the piston 106 is currently in its retracted position by virtue of the signal input to the digital logic unit 144 from advanced position sensor 112 indicating that the piston 106 is not advanced, and from retracted position sensor 110 indicating that the piston 106 is retracted. Therefore, knowing that the piston 106 is in its retracted position and that it must be advanced, the digital logic unit 144 outputs digital logic signals to the solenoid driver 146 and the solenoid driver 152. The solenoid driver 146 then level shifts and amplifies the digital logic signal input to it from the digital logic unit 144, and outputs the shifted and amplified signal to the solenoid 124. The solenoid 124 then activates and causes the fill valve section 132 of the universal valve 120 to move to the right (referring to orientation in the example in FIG. 3) so that the fill valve section 132 becomes engaged with the compressed air line 131, the exhaust air line 133, and the port 114. At this time compressed air seeks to flow through compressed air line 131 through the fill valve section 132 of the universal valve 120, through the port 114 and into the left cylinder section 118 which puts pressure on piston 106 causing it to begin to move to its advanced position.

At the same time the solenoid driver 152 then level shifts and amplifies the digital logic signal input to it from the digital logic, and outputs the shifted and amplified signal to the solenoid 130. The solenoid 130 then activates and causes the exhaust valve section 136 of the universal valve 122 to move to the left (referring to orientation in the example in FIG. 3) so that the exhaust valve section 136 becomes engaged with the compressed air line 131, the exhaust air line 133, and the port 116. At this time any compressed air within right cylinder section 119 will seek to flow through the port 116, then through the exhaust valve section 136 of the universal valve 122, and into the exhaust air line 133 whereupon the air will be exhausted to the atmosphere. In this way, as the piston 106 is being caused to move to its advanced position as described above, any compressed air trapped in right cylinder section 119 can be released instead of being further compressed by the right-ward movement of the piston 106, and therefore the movement of the piston 106 to the right is not hindered by the presence of any trapped compressed air within the right cylinder section 119.

At this juncture the piston 106 is smoothly translating to the right, approaching its advanced position as originally commanded by the host control system 101. When the piston 106 reaches its advanced position, advanced position sensor 112 outputs a digital logic signal to the digital logic unit 144 indicating that the piston 106 has reached its advanced position. Note that at this time the pressure within the left cylinder section 118 may be substantially less than the pressure of the air entering compressed air line 131, and the pressure within right cylinder section 119 may be substantially more than the atmospheric air pressure that the exhaust air line 133 leads to.

At this time the digital logic unit 144 can: do nothing (as is the case in the prior art), such that compressed air continues to enter left cylinder section 118, as described above, until the air pressure within left cylinder section 118 reaches the air pressure of the compressed air found at the entrance of the compressed air line. However, since the piston 106 has already moved to its commanded advanced position, this additional flow of compressed air is unnecessary and wasteful.

Also, if the digital logic unit 144 does nothing after piston 106 is advanced, then the residual compressed air of right cylinder section 119 will be exhausted to the atmosphere (as described above), until it is drained of compressed air. Since piston 106 has already moved to its commanded advanced position, this additional exhausting of compressed air is unnecessary. Further, since the piston 106 at some future time must be moved to its retracted position (there are only two piston position choices: advanced and retracted) in which case right cylinder section 119 must be refilled with compressed air, the additional exhausting of air also is wasteful.

The alternate course of action that the digital logic unit 144 can take when the piston 106 reaches its advanced position is to immediately block the flow of compressed air into left cylinder section 118 and block the flow of compressed air out of right cylinder section 118. Preventing these air flows, (in which the full pressure and force of the piston 106 may not be needed) does not impact the performance of the actuator 102 as the piston 106 has already reached its terminal position, and minimizes wasteful air flows, improves the utilization efficiency of the compressed air, and reduces operating costs. Preventing or minimizing air flows after the piston 106 has reached its terminal position is an advantage of examples of the claimed technology.

To optimize the efficient utilization of compressed air, the digital logic unit 144 will command the universal valves 120 and 122 to the blocked position after it receives an indication from the advanced position sensor 112 no later than when the piston 106 has reached its advanced position. Note the movement of the universal valves 120 and 122 may in this example be accomplished under the control of the digital logic unit 144 without the intervention of the host control system 101. This is accomplished by the digital logic unit 144 outputting digital logic signals to the solenoid driver 148 and the solenoid driver 150. The solenoid driver 148 then level shifts and amplifies the digital logic signal input to it from the digital logic unit 144, and outputs the shifted and amplified signal to the solenoid 126. The solenoid 126 then activates and causes the block valve section 134 of the universal valve 120 to move to the left (referring to orientation in the example in FIG. 3) so that the block valve section 134 becomes engaged with the compressed air line 131, the exhaust air line 133, and the port 114. The solenoid driver 150 also level shifts and amplifies the digital logic signal input to it from the digital logic unit 144, and outputs the shifted and amplified signal to the solenoid 128. The solenoid 128 then activates and causes the block valve section 134 of the universal valve 122 to move to the right (referring to orientation in the example in FIG. 3) so that the block valve section 134 becomes engaged with the compressed air line 131, the exhaust air line 133, and the port 116. When this is accomplished no air can move into or out of left cylinder section 118 and right cylinder section 119, and the piston 106 is substantially locked into its fully advanced position.

At this juncture it is normal for the digital logic unit 144 to send a status message to the host control system 101 in which the host control system 101 is notified that piston 106 has reached its fully advanced position as initially commanded by the host control system 101. The status message process begins by the digital logic unit 144 creating and formatting a predetermined status update message that the host control system 101 recognizes as meaning that the piston 106 has reached its advanced position. This status message is then transmitted by the digital logic unit 144 to the serial bus interface 142A through internal communication bus 139. Serial bus interface 142A then converts the format of the data and signal from that of the internal communication bus 139 to that of the external communication bus 138A, and then transmits the converted status message data over the external communication bus 138A to the host control system 101.

Some time later, in response to other external events, or even the passage of time, the host control system 101 will determine that the piston 106 will need to be retracted. The host control system 101 will then transmit data through the external serial communication bus 138A to the directional control valve system 100(1) that is a command for the piston 106 to move to its retracted position. The command passes through the serial bus interface 142A which converts the format of the data and signal of the external communication bus 138A from the bus standard to the digital logic levels of the internal communication bus 139. The command to move the piston 106 to its retracted position then passes through the internal communication bus 139 to the digital logic unit 144. The digital logic unit 144 then receives and parses the command to withdraw the piston 106. The digital logic unit 144 also has data indicating that the piston 106 is currently in its advanced position by virtue of the signal input to the digital logic unit 144 from advanced position sensor 112 indicating that the piston 106 is advanced, and is confirmed by retracted position sensor 110 indicating that the piston 106 is not retracted.

Therefore, knowing that the piston 106 is in its advanced position and that it must be retracted, the digital logic unit 144 outputs digital logic signals to the solenoid driver 148 and the solenoid driver 150. The solenoid driver 150 then level shifts and amplifies the digital logic signal input to it from the digital logic unit 144, and outputs the shifted and amplified signal to the solenoid 128. The solenoid 128 then activates and causes the fill valve section 132 of the universal valve 122 to move to the right (referring to orientation in the example in FIG. 3) so that the fill valve section 132 becomes engaged with the compressed air line 131, the exhaust air line 133, and the port 116. At this time compressed air seeks to flow through compressed air line 131 through the fill valve section 132 of the universal valve 122, through the port 116 and into the right cylinder section 119 which puts pressure on piston 106 causing it to begin to move to its retracted position.

At the same time the solenoid driver 148 then level shifts and amplifies the digital logic signal input to it from the digital logic unit 144, and outputs the shifted and amplified signal to the solenoid 126. The solenoid 126 then activates and causes the exhaust valve section 136 of the universal valve 120 to move to the left (referring to orientation in the example in FIG. 3) so that the exhaust valve section 136 becomes engaged with the compressed air line 131, the exhaust air line 133, and the port 114. At this time any compressed air within left cylinder section 118 will seek to flow through the port 114, then through the exhaust valve section 136 of the universal valve 120, and into the exhaust air line 133 whereupon the air will be exhausted to the atmosphere. In this way, as the piston 106 is being caused to move to its retracted position as described above, any compressed air trapped in left cylinder section 118 can be released instead of being further compressed by the leftward movement of the piston 106, and therefore the movement of the piston 106 to the left is not hindered by the presence of any trapped compressed air within the left cylinder section 118.

At this juncture the piston 106 is smoothly translating to the left, approaching its retracted position as originally commanded by the host control system 101. When the piston 106 reaches its retracted position, retracted position sensor 110 outputs a digital logic signal to the digital logic unit 144 indicating that the piston 106 has reached its retracted position. Note that at this time the pressure within the right cylinder section 119 may be substantially less than the pressure of the air entering compressed air line 131, and the pressure within left cylinder section 118 may be substantially more than the atmospheric air pressure that the exhaust air line 133 leads to.

At this time the digital logic unit 144 can do one of two things: the first is to do nothing, in which case compressed air continues to enter right cylinder section 119, as described above, until the air pressure within right cylinder section 119 reaches the air pressure of the compressed air found at the entrance of the compressed air line 131. However, since the piston 106 has already moved to its commanded retracted position, this additional flow of compressed air is unnecessary and wasteful. Also, if the digital logic unit 144 does nothing after piston 106 is retracted, then the residual compressed air of left cylinder section 118 will be exhausted to the atmosphere until it is drained of compressed air. Since piston 106 has already moved to its commanded retracted position, this exhausting of compressed air is unnecessary. Further, since the piston 106 at some future time must be moved to its advanced position (there are only two piston position choices: advanced and retracted) in which case left cylinder section 118 must be refilled with compressed air, the additional exhausting of air also is wasteful.

The alternate course of action that the digital logic unit 144 can take when the piston 106 reaches its retracted position is to immediately block the flow of compressed air into right cylinder section 119 and block the flow of exhaust air out of left cylinder section 118. Preventing these air flows does not impact the performance of the actuator 102 as the piston 106 has already reached its terminal position, and minimizes wasteful air flows, improves the utilization efficiency of the compressed air, and reduces operating costs. Preventing or minimizing air flows after the piston 106 has reached its terminal (retracted) position is an advantage of examples of the claimed technology.

To optimize the efficient utilization of compressed air, the digital logic unit 144 will command the universal valves 120 and 122 to the blocked position after it receives an indication from retracted position sensor 110 that the piston 106 has reached its retracted position. Note the movement of the universal valves 120 and 122 to block the flow of air is accomplished under the control of the digital logic unit 144 without the intervention of the host control system 101, although in other examples the host control system 101 can control the movement of the universal valves 120 and 122 directly. This is accomplished by the digital logic unit 144 outputting digital logic signals to the solenoid driver 146 and the solenoid driver 152. The solenoid driver 146 then level shifts and amplifies the digital logic signal input to it from the digital logic unit 144, and outputs the shifted and amplified signal to the solenoid 124. The solenoid 124 then activates and causes the block valve section 134 of the universal valve 120 to move to the right (referring to orientation in the example in FIG. 3) so that the block valve section 134 becomes engaged with the compressed air line 131, the exhaust air line 133, and the port 114. The solenoid driver 152 also level shifts and amplifies the digital logic signal input to it from the digital logic unit 144, and outputs the shifted and amplified signal to the solenoid 130. The solenoid 130 then activates and causes the block valve section 134 of the universal valve 122 to move to the left (referring to orientation in the example in FIG. 3) so that the block valve section 134 becomes engaged with the compressed air line 131, the exhaust air line 133, and the port 116. When this is accomplished no air can move into or out of left cylinder section 118 and right cylinder section 119, and the piston 106 is substantially locked into its fully retracted position.

At this juncture the digital logic unit 144 can optionally send a status message to the host control system 101 in which the host control system 101 is notified that piston 106 has reached its fully retracted position as commanded by the host control system 101. The status message process begins by the digital logic unit 144 creating and formatting a predetermined status update message that the host control system 101 recognizes as meaning that the piston 106 has reached its retracted position. This status message is then transmitted by the digital logic unit 144 to the serial bus interface 142A through internal communication bus 139. Serial bus interface 142A then converts the format of the data and signal from that of the internal communication bus 139 to that of the external communication bus 138A, and then transmits the converted status message data over the external communication bus 138A to the host control system 101.

While the actuator system 102 that uses a single universal controller 140 has several advantages over the prior art, additional improvements to the actuator system 102 are still possible. For example, the design engineer still needs to determine an economical and efficient location for the universal controller 140, and minimize the installation labor associated with running the four solenoid control lines, the two position sensing lines, as well as the external serial communication buses 138A and 138B. The most practical location for the universal controller 140 is generally at or near the cylinder 104, but then special mounts and mechanics must be designed, procured, and installed, onto which the universal controller 140 is mounted proximal to the cylinder 104 thus negating some of the benefits of mounting the universal controller 140 at the cylinder 104.

Figure 4:
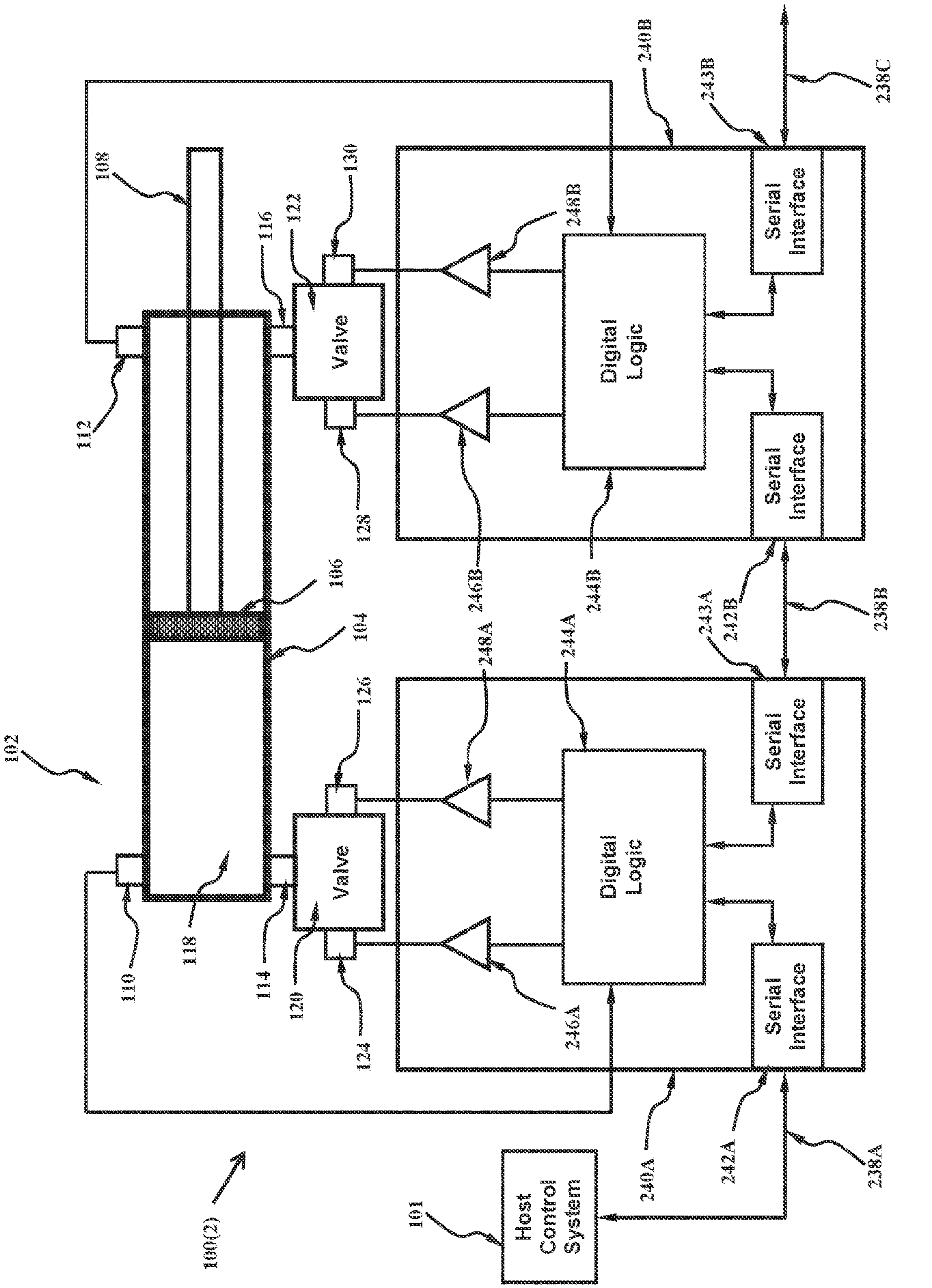
FIG. 4 is a diagram of an example of another actuator system incorporating universal valves in which valve controls are divided into two circuits in communication with one another.

Referring to FIG. 4, another example of a directional control valve system 100(2) is illustrated. The directional control valve system 100(2) is the same in structure and operation as the directional control valve system 100(1), except as otherwise illustrated and described herein. Elements in directional control valve system 100(2) which are like those in directional control valve system 100(1) will have like reference numerals.

This mounting problem described above can be remedied by dividing the universal controller 140 for two valves into two circuits, a universal controller 240A for one valve and a second universal controller 240B as shown in FIG. 4, in which universal controller 240A and universal controller 240B are substantially identical. Universal controllers 240A and 240B are the same in structure and operation as universal controller 140, except as otherwise illustrated and described herein. Elements in universal controllers 240A and 240B which are like those in universal controller 140 will have like reference numerals.

In this example, universal controller 240A can be mounted proximate to the universal valve 120, onto the universal valve 120, or even integrated with the universal valve 120. In the latter case the electrical connections between the solenoid driver 246A and the solenoid 124, as well as the electrical connections between the solenoid driver 248A and the solenoid 126, are made during the manufacturing of the universal valve 120 thus saving the installer from having to make these connections manually thereby saving time and reducing installation costs. Similarly, universal controller 240B can be mounted proximate to the universal valve 122, onto the universal valve 122, or even integrated with the universal valve 122. In the latter case the electrical connections between the solenoid driver 246B and the solenoid 128, as well as the electrical connections between the solenoid driver 248B and the solenoid 130, are made during the manufacturing of the universal valve 122 thus saving the installer from having to make these connections manually thereby saving time and reducing installation costs.

The universal controller for one valve 240A, as shown in FIG. 4, includes the digital logic 244A has outputs coupled to inputs of the solenoid drivers 246A and 248A that in turn have outputs coupled to the solenoids 124 and 126, respectively. Solenoid drivers 246A and 248A are the same as solenoid drivers 146 and 148 in structure and operation, except as otherwise illustrated or described herein.

The digital logic 244A also has an input coupled to an output of retracted position sensor 110. Lastly, the digital logic 244A has two bidirectional data ports, one coupled to serial interface 242A and another coupled to serial interface 243A. Serial interfaces 242A and 243A are the same in structure and operation as serial interface 142A, except as otherwise illustrated or described herein.

Likewise, the second universal controller for one valve 240B, as shown in FIG. 4, includes the digital logic 244B having outputs coupled to inputs of the solenoid drivers 246B and 248B that in turn have outputs coupled to the solenoids 128 and 130, respectively. Solenoid drivers 246B and 248B are the same as solenoid drivers 150 and 152 in structure and operation, except as otherwise illustrated or described herein The digital logic 244B also has an input coupled to an output of advanced position sensor 112. Lastly, the digital logic 244B has two bidirectional data ports, one coupled to a serial interface 242B and another coupled to serial interface 243B.

Serial interfaces 242B and 243B are the same in structure and operation as serial interface 142B, except as otherwise illustrated or described herein Serial interface 243A of universal controller 240A is generally coupled to a serial interface 242B of downstream universal controller 240B through a serial communication bus 238B through which digital data may be communicated between the digital logic 244A and the digital logic 244B. A second serial interface 242A of universal controller 240A can be coupled via a serial communication bus 238A to a host control system 101, a PLC, or to another serial interface 243C of a universal controller 240C (none of which are shown in FIG. 4, but are illustrated in FIG. 6).

The operation of the actuator system 100(2) having two controllers will now be described with reference to FIG. 4, by way of a simple example in which the piston 106 is advanced and then retracted. To initiate the process, a host control system 101 may issue a command over external serial communication bus 238A to universal controller 240A to extend the piston 106. This command is received by serial interface 242A which reformats the signal and passes it along to the digital logic 244A. The digital logic 244A at this point sends a command through serial interface 243A, external serial communication bus 238B, and serial interface 242B to the digital logic 244B telling it that it has received a command from a host control system 101 to extend the piston 106. The digital logic 244A also issues electronic signals to the solenoid driver 246A and the solenoid driver 248A that cause the appropriate activations of the solenoid 124 and the solenoid 126 respectively such that the universal valve 120 is switched so that compressed air is allowed to flow through the port 114 into left cylinder section 118 such that the compressed air introduced into left cylinder section 118 induces a force on piston 106 causing it to begin to move into the advanced position.

When the digital logic 244B receives the command from the digital logic 244A that the piston 106 is to be advanced, the digital logic 244B outputs electronic signals to the solenoid driver 246B and the solenoid driver 248B that cause the appropriate activation of the solenoid 128 and the solenoid 130 respectively such that the universal valve 122 is switched so that compressed air is allowed to flow or exhaust through the port 116 from right cylinder section 119 such that the compressed air in right cylinder section 119, which is inducing a force on piston 106 to remain in the retracted position, is relieved, thereby allowing the piston to begin to move into the advanced position.

After the piston 106 reaches its advanced position, advanced position sensor 112 sends a signal to the digital logic 244B indicating such. The digital logic 244B then issues a "piston-advanced" status message to serial interface 242B which then transmits the status message over external communication bus 238B which is then received by serial interface 243A which in turn passes the status message along to the digital logic 244A. The digital logic 244A then outputs electronic signals to the solenoid driver 246A and the solenoid driver 248A that cause the appropriate activation of the solenoid 124 and the solenoid 126 respectively such that the universal valve 120 is switched so that no compressed air is allowed to flow through the port 114 into or out of left cylinder section 118 such that the piston becomes effectively locked in its advanced position. Note this may occur even before the air pressure in left cylinder section 118 has reached the level of the compressed air provided to the universal valve 120, thereby offering an improvement in operating efficiency and reduced cost as described earlier in connection with FIG. 2. When the digital logic 244A receives the "piston-advanced" status message from the digital logic 244B, the digital logic 244A prepares a similar "piston-advanced" status message that is then transmitted to a host control system 101 through serial interface 242A and external communication bus 238A, so the host control system 101 becomes aware that its original command to extend the piston 106 has been fulfilled.

Next, after some time has elapsed, or in response to other external events, the host control system 101 issues a command over external serial communication bus 238A to universal controller 240A to retract the piston 106. This command is received by serial interface 242A which reformats the signal and passes it along to the digital logic 244A. The digital logic 244A at this point sends a command through serial interface 243A, external serial communication bus 238B, and serial interface 242B to the digital logic 244B telling it that it has received a command from the host control system 101 to retract the piston 106. The digital logic 244A also issues electronic signals to the solenoid driver 246A and the solenoid driver 248A that cause the appropriate activation of the solenoid 124 and the solenoid 126 respectively such that the universal valve 120 is switched so that compressed air is allowed to flow or exhaust through the port 114 from left cylinder section 118 such that the compressed air in left cylinder section 118, which is inducing a force on piston 106 to remain in the advanced position, is relieved, thereby allowing the piston 106 to begin to move into the retracted position. When the digital logic 244B receives the command from the digital logic 244A that the piston 106 is to be retracted, the digital logic 244B outputs electronic signals to the solenoid driver 246B and the solenoid driver 248B that cause the appropriate activation of the solenoid 128 and the solenoid 130 respectively such that the universal valve 122 is switched so that compressed air is allowed to flow through the port 116 into right cylinder section 119 such that the compressed air introduced into right cylinder section 119 induces a force on piston 106 causing it to begin to move into its retracted position.

After the piston 106 reaches its retracted position, retracted position sensor 110 sends a signal to the digital logic 244A indicating such. The digital logic 244A then issues a "piston-retracted" status message to serial interface 243A which then transmits the status message over external communication bus 238B which is then received by serial interface 242B which in turn passes the status message along to the digital logic 244B. The digital logic 244B then outputs electronic signals to the solenoid driver 246B and the solenoid driver 248B that cause the appropriate activation of the solenoid 128 and the solenoid 130 respectively such that the universal valve 122 is switched so that no compressed air is allowed to flow through the port 116 into or out of right cylinder section 119 such that the piston 106 becomes effectively locked in its retracted position. Note this may occur even before the air pressure in right cylinder section 119 has reached the pressure of the compressed air provided to the universal valve 122, thereby offering an improvement in operating efficiency and reduced cost as described earlier in connection with FIG. 2.

Also when the digital logic 244A receives the piston-retracted signal from retracted position sensor 110, the digital logic 244A then outputs electronic signals to the solenoid driver 246A and the solenoid driver 248A that cause the appropriate activation of the solenoid 124 and the solenoid 126 respectively such that the universal valve 120 is switched so that no compressed air is allowed to flow through the port 114 into or out of left cylinder section 118 such that the piston 106 becomes effectively locked in its retracted position. Note this may occur even before the air pressure in left cylinder section 118 has reached the ambient air pressure, thereby offering an improvement in operating efficiency and reduced cost as described in connection with FIG. 2.

Additionally, when the digital logic 244A receives the piston-retracted signal from retracted position sensor 110, the digital logic 244A prepares a "piston-retracted" status message that is then transmitted to a host control system 101 through serial interface 242A and external communication bus 238A, so the host control system 101 becomes aware that its original command to retract the piston 106 has been fulfilled.

As illustrated in the preceding discussion in connection with FIG. 4 (and FIG. 2), the external communication buses 238A, 238B, and 238C (as well as external communication bus 138) are components of the actuator system 100(2) using two controllers 240A and 240B (and actuator system using a single controller within the directional control valve system 100(1), respectively).

Figure 5A:
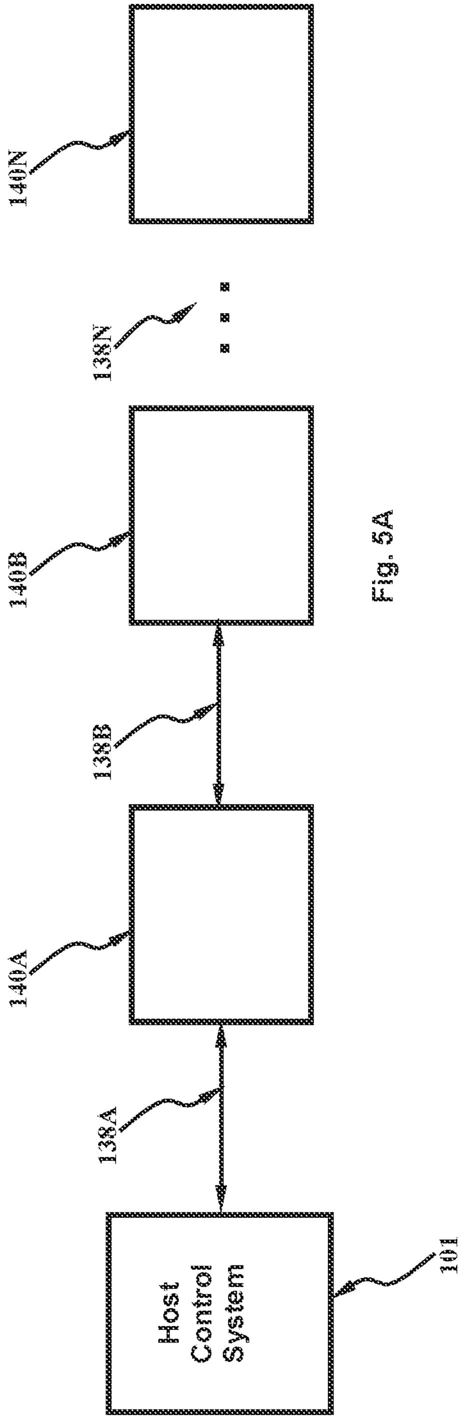
FIG. 5A is a diagram of communication links between control circuits of an actuator system incorporating universal valves; in which the valve control electronics reside on a single circuit board.

Referring to FIG. 5A, another example of the claimed technology with multiple universal controllers 140A, 140B, . . . 140N, etc. illustrated., can communicate with a single host control system 101 through a daisy-chained communication path, in which the communication path passes through each of the universal controllers 140A, 140B, . . . 140N, by way of their respective serial bus interfaces. Each of the universal controllers 140A, 140B, . . . 140N, has within it a unique digital address, generally stored in memory, associated with the digital logic unit 144 that is known to that controller as well as the host control system 101. The host control system 101 has a unique address as well, perhaps defaulting to a value of "0000", whose address is known to all of the controllers 140A, 140B, . . . 140N.

When the host control system 101 issues a command to a directional control valve system 100(1), having an address, the command is issued by the host control system 101 (the address is embedded in the command) over external serial communication bus 138A. This command is subsequently received by the serial interface 142A of the universal controller 140A, and the address is parsed and inspected by the digital logic unit 144 to see if the command is for this particular the universal controller 140A. If it is, then the universal controller 140A acts upon the command; if not, then the universal controller 140A simply forwards the command to the universal controller 140B by way of the serial interfaces and external serial communication bus 138B in a manner described previously. This command is then received by the serial interface of the universal controller 140B, and the address is parsed and inspected by its digital logic to see if the command is for this particular the universal controller 140B. If it is, then the universal controller 140B acts upon the command; if not, then the universal controller 140B simply forwards the command to universal controller 140N by way of the serial interfaces and external serial communication bus 138N in a manner described previously, although other command and message processing methods can be utilized as well. The command forwarding process repeats until the command reaches the controller having the address embedded in the command, in which case that particular controller processes and acts upon the command.

Likewise, when a controller has a status message for the host control system 101, it issues the status message, with the host computer's address, over the serial interface and in a direction that is association with the host computer (e.g., the left serial interface 142A in FIG. 2; the left serial interfaces 242A and 242B in FIG. 4). This status message then travels up the daisy chain communication path, passing through the controllers (who all have the wrong address since they are not the host control system 101) and respective serial interfaces and digital logic until the status message reaches the host control system 101. Note that status messages can also be sent between controllers (in each direction, up and down the daisy chain) as long as they have knowledge of one another's addresses, but normally only the host control system 101 issues commands.

Figure 5B:
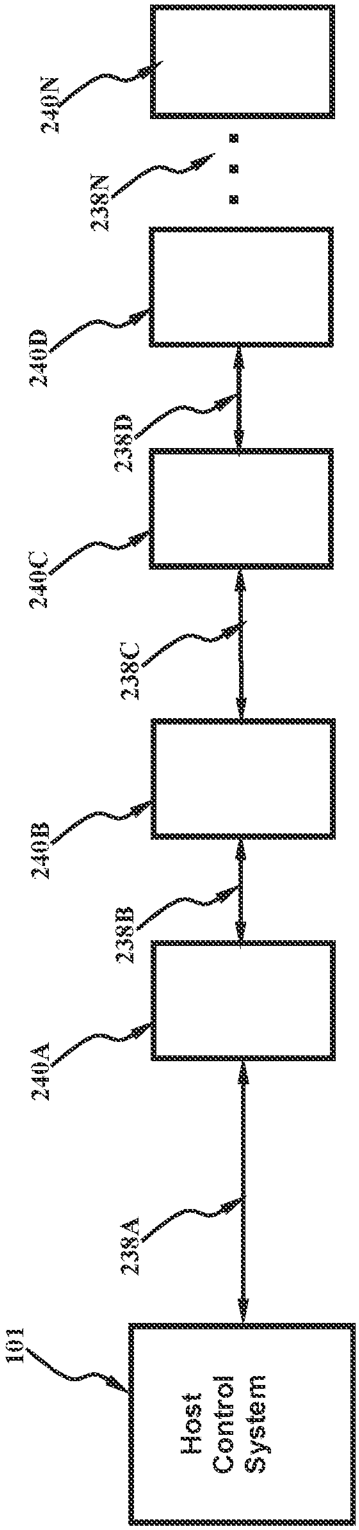
FIG. 5B is a diagram of communication links between control circuits of an actuator system incorporating universal valves in which the valve control electronics for each actuator are divided into two circuits.

Referring to FIG. 5B, an example of a daisy-chain communication bus between controllers in which the controllers are universal controllers for one valve. As before, each universal controller for one valve 240A, 240B, 240C, etc. has a unique address that is used to determine if a controller is to act upon a command message issued by the host control system 101, and for identifying itself when it issues status messages over the daisy-chained communication bus. Note that this daisy-chain communication protocol not only allows for communications between the host control system 101 and directional control valve systems 100(1) using a single controller, and for communications between the host control system 101 and actuator systems using two controllers 240A and 240B, but also for communications between a host control system 101 and systems employing a mix of both single controller and two-controller directional control systems, as well as non-actuator devices such as printers, monitors, data loggers, modems, etc., as long as they adhere to the communication bus protocol.

Referring to FIG. 6, another example of a directional control valve system 100(3) is illustrated. The directional control valve system 100(3) is the same in structure and operation as the directional control valve system 100(1), except as otherwise illustrated and described herein. Elements in directional control valve system 100(3) which are like those in directional control valve system 100(1) will have like reference numerals.

In this example, an additional improvement can be made by replacing retracted position sensor 110 and advanced position sensor 112 with a continuous position sensor 310. A continuous position sensor 310 outputs an analog signal, such as a voltage, whose magnitude is proportional to the position of the piston 106 within the cylinder 104. That is, for example, the more the piston 106 is positioned into its advanced position, the greater the voltage output by the continuous position sensor 310. The output of continuous position sensor 310 is coupled to an input of an electronic buffer 304 that amplifies and conditions the signal output by the continuous position sensor 310. The output of buffer 304 is coupled to an input of an analog-to-digital converter (A/D converter) 306 that converts the buffered analog signal output by the continuous position sensor 310 into a digital format. This digital format is then output by the A/D converter 306 over a data bus to an input, or a series of inputs, of the digital logic 344. Note, however, that continuous position sensor 310 can alternately output digital data that would be coupled directly to an input (or a plurality of inputs) of the digital logic 344 without the need for A/D converter 306.

There are at least two advantages to having continuous piston position sensing over the two-point piston position sensing configuration described earlier. One advantage is that not all applications require the piston 106 to reach a fully retracted and/or fully advanced position, and knowing where the piston 106 lies between these extremes allows the digital logic 344 to precisely control the location of the piston 106 between these end-points. This additional degree of control allows for an even more efficient utilization of compressed air and a corresponding reduction in operating costs.

Another advantage to having continuous sensing of the location of the position of the piston is more subtle. After a number of cycles of piston retractions and extractions in which the continuous position of the piston 106 is sensed and tracked in time by the digital logic 344 during these cycles, the digital logic 344 can "learn" how long a valve (the universal valves 120 or 122) or the valves (the universal valves 120 and 122) must be in a particular position—and for how long—to effect a given movement of the piston 106. After the piston 106 position as a function of time and valve positions has been characterized (and stored in memory) by the digital logic 344 during the learning process (i.e., during a Learn Mode), then the digital logic 344 can use the characterization data stored in memory to anticipate the upcoming position of the piston 106 as a function of time and current valve positions. This anticipation, and corresponding pro-active actions by the digital logic 344 to switch the air-flows through the air-circuits before they would otherwise occur, allows for an even more efficient utilization of compressed air and a corresponding reduction in operating costs. The Learn Mode can also be applied to both continuous piston movements as well as to discrete (e.g., two-position) piston movements.

One example of the usefulness of the Learn Mode and its application is when the piston 106 is moving and approaching its fully advanced (or retracted) position. Without the characterization data obtained during a Learn Mode, the digital logic 344 or 144 would not cause the universal valves 120 and/or 122 to switch until the piston 106 reached its fully advanced (or retracted) position. But with the characterization data available to it, the digital logic 344 can cause universal valves 120 and/or 122 to switch before the piston 106 reached its fully advanced (or retracted) position, with the understanding that the piston 106 will still eventually reached its terminal position. This early-switching action reduces the consumption of compressed air and, correspondingly, reduces the operating costs of the actuator system 100(3) with continuous position sensing.

Figure 7A:
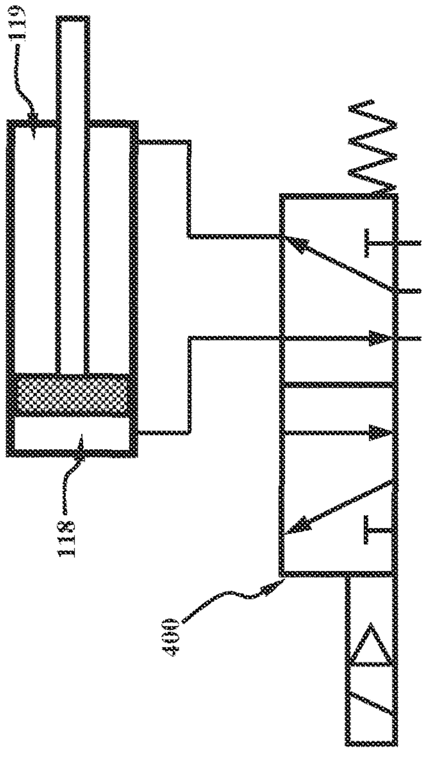
Fig. 7A (Prior Art)
FIG. 7A is a diagram of an example of a prior art 5-way 2-position single-solenoid spring-return actuator system.

As mentioned earlier, the actuator system of the present invention can perform the functions of actuator systems incorporating any valve type. Referring to FIG. 7A, a prior art actuator incorporating a 5-way 2-position single-solenoid spring return valve 400 is illustrated. When spring return valve 400 is in its left position (as shown in FIG. 7A), compressed air flows into the right cylinder section 119 and compressed air is exhausted from left cylinder section 118 and the piston moves to the left. When spring return valve 400 is in its right position, compressed air flows into the left cylinder section 118 and compressed air is exhausted from right cylinder section 119 and the piston moves to the right.

Figure 7B:
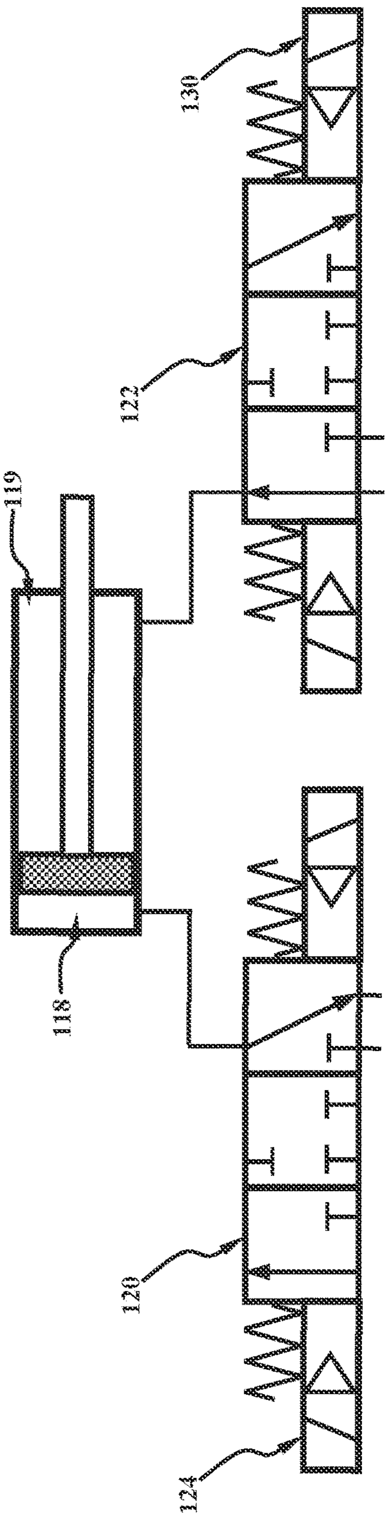
FIG. 7B is a diagram of another example of an implementation of an actuator system with universal valves.

Referring to FIG. 7B, an example of how a pair of universal valves 120 and 122 can be used to implement the function of the 5-way 2-position single-solenoid spring return valve of FIG. 7A is illustrated. When the universal valve 120 is in its right-most position and the universal valve 122 is in its left position, compressed air flows into the left cylinder section 118 and compressed air is exhausted from right cylinder section 119 and the piston moves to the right. When the universal valve 120 is in its left-most position (as shown in FIG. 7B) and the universal valve 122 is in its right position (as shown in FIG. 7B), compressed air flows into the right cylinder section 119 and compressed air is exhausted from the left cylinder section 118 and the piston moves to the left.

Figure 8A:
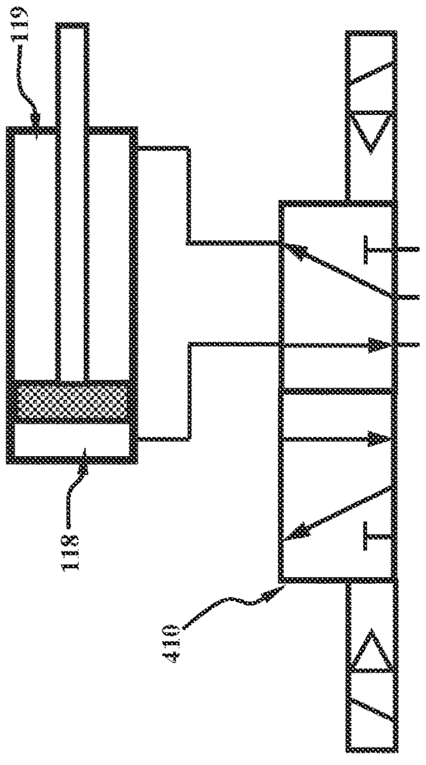
Fig. 8A (Prior Art)
FIG. 8A is a diagram of an example of a prior art 5-way 2-position double-solenoid actuator system.

Referring to FIG. 8A, a prior art actuator incorporating a 5-way 2-position double-solenoid valve 410 is illustrated. When valve 410 is in its left position (as shown in FIG. 8A), compressed air flows into the right cylinder section 119 and compressed air is exhausted from left cylinder section 118 and the piston moves to the left. When valve 410 is in its right position, compressed air flows into the left cylinder section 118 and compressed air is exhausted from right cylinder section 119 and the piston moves to the right.

Figure 8B:
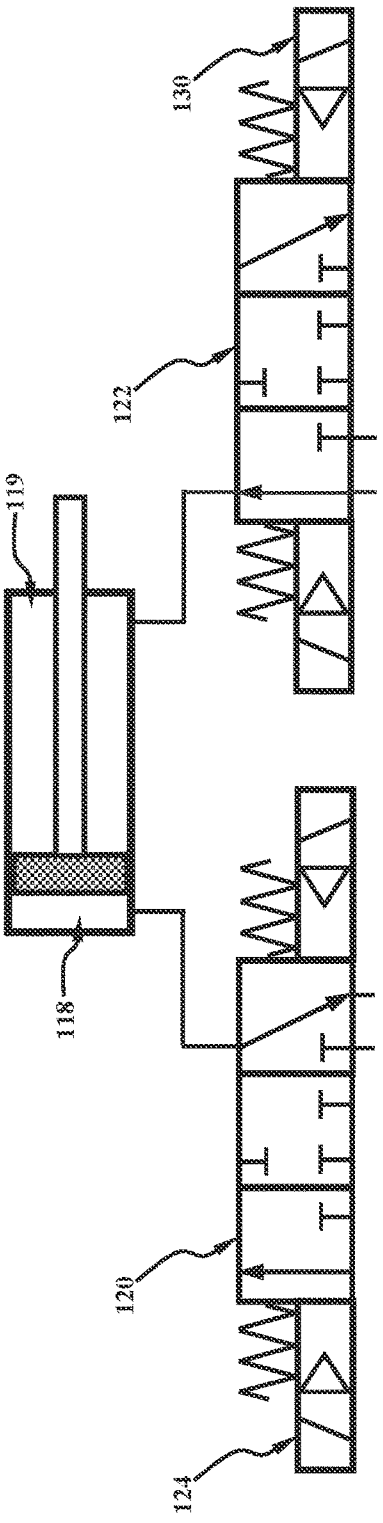
FIG. 8B is a diagram of yet another example of an implementation of an actuator system with universal valves.

Referring to FIG. 8B, and an example of how a pair of the universal valves 120 and 122 can be used to implement the function of the 5-way 2-position double-solenoid valve of FIG. 8A is illustrated. When the universal valve 120 is in its right-most position and the universal valve 122 is in its left position, compressed air flows into the left cylinder section 118 and compressed air is exhausted from right cylinder section 119 and the piston moves to the right. When the universal valve 120 is in its left-most position (as shown in FIG. 8B) and the universal valve 122 is in its right position (as shown in FIG. 8B), compressed air flows into the right cylinder section 119 and compressed air is exhausted from the left cylinder section 118 and the piston moves to the left.

Figure 9A:
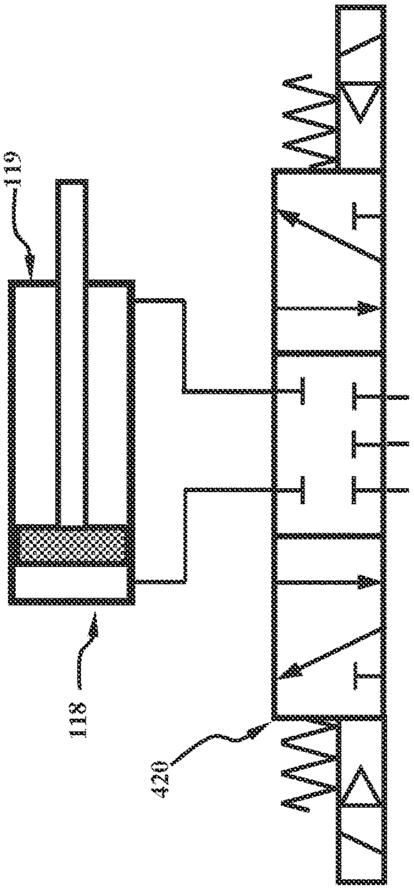
Fig. 9A (Prior Art)
FIG. 9A is a diagram of an example of a prior art 5-way 3-position double-solenoid blocked-center actuator system.

Referring to FIG. 9A, a prior art actuator incorporating a 5-way 3-position double-solenoid blocked-center valve 420 is illustrated. When valve 420 is in its right position compressed air flows into the left cylinder section 118 and compressed air is exhausted from the right cylinder section 119 and the piston moves to the right. When valve 420 is in its center position (as shown in FIG. 9A) compressed air is blocked from flowing into or out of either of the cylinder sections and the piston is substantially prevented from moving. When double-solenoid valve 410 is in its left position, compressed air flows into the right cylinder section 119 and compressed air is exhausted from the left cylinder section 118 and the piston moves to the left.

Figure 9B:
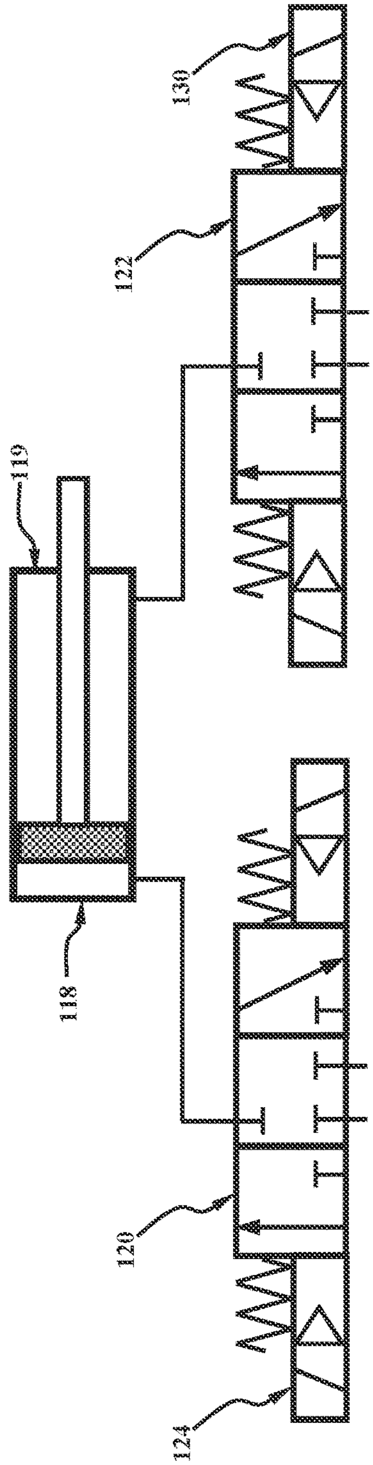
FIG. 9B is a diagram of a further example of an implementation of an actuator system with universal valves.

Referring to FIG. 9B, an example of how a pair of universal valves 120 and 122 can be used to implement the function of the 5-way 3-position double-solenoid blocked-center valve of FIG. 9A is illustrated. When the universal valve 120 is in its right-most position and the universal valve 122 is in its left position, compressed air flows into the left cylinder section 118 and compressed air is exhausted from right cylinder section 119 and the piston moves to the right. When the universal valve 120 is in its center position (as shown in FIG. 9B) and when the universal valve 122 also is in its center position (as shown in FIG. 9B) compressed air is blocked from flowing into or out of either of the cylinder sections and the piston is substantially prevented from moving. When the universal valve 120 is in its left-most position and the universal valve 122 is in its right position, compressed air flows into the right cylinder section 119 and compressed air is exhausted from the left cylinder section 118 and the piston moves to the left. Thus the universal valves 120 and 122 can be positioned to accomplish the functionality of a 5-way 3-position double-solenoid blocked-center valve 420.

Figure 10A:
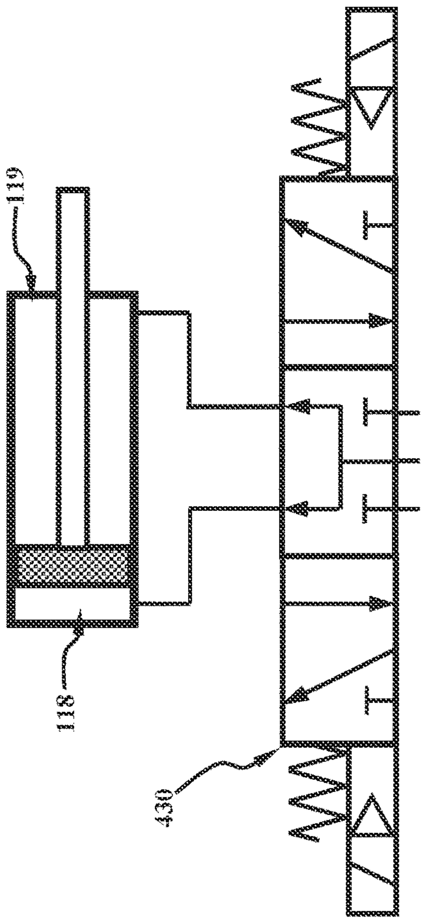
Fig. 10A (Prior Art)
FIG. 10A is a diagram of an example of a prior art 5-way 3-position double-solenoid pressurized-center actuator system.

Referring to FIG. 10A, a prior art actuator incorporating a 5-way 3-position double-solenoid pressurized-center valve 430 is illustrated. When valve 430 is in its right position compressed air flows into the left cylinder section 118 and compressed air is exhausted from the right cylinder section 119 and the piston moves to the right. When valve 430 is in its center position (as shown in FIG. 10A) both the right and the left cylinder sections become filled with compressed air and the piston is substantially prevented from moving. When valve 430 is in its left position, compressed air flows into the right cylinder section 119 and compressed air is exhausted from the left cylinder section 118 and the piston moves to the left.

Figure 10B:
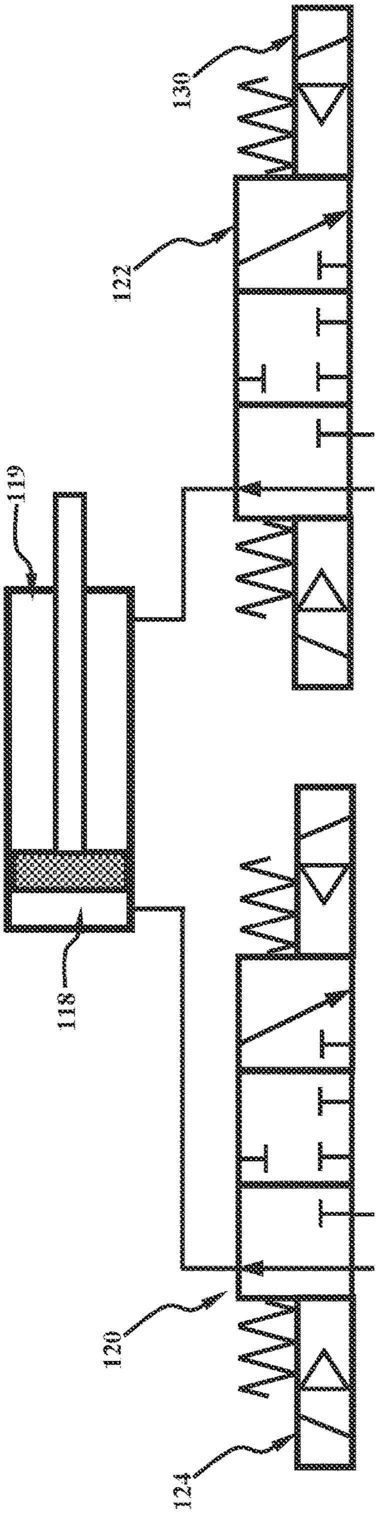
FIG. 10B is a diagram of an additional example of an implementation of an actuator system with universal valves.

Referring to FIG. 10B, an example of how a pair of the universal valves 120 and 122 can be used to implement the function of the 5-way 3-position double-solenoid pressurized-center valve of FIG. 10A is illustrated. When the universal valve 120 is in its right-most position and the universal valve 122 is in its left-most position, compressed air flows into the left cylinder section 118 and compressed air is exhausted from the right cylinder section 119 and the piston moves to the right. When the universal valve 120 is in its right-most position and the universal valve 122 also is in its right position (as shown in FIG. 10B), compressed air flows into the left cylinder section 118 and compressed air flows into right cylinder section 119 and the piston is substantially prevented from moving. When the universal valve 120 is in its left position and when the universal valve 122 is in its right position, compressed air flows into the right cylinder section 119 and compressed air is exhausted from the left cylinder section 118 and the piston moves to the left. Thus valves 120 and 122 can be positioned to accomplish the functionality of a 5-way 3-position double-solenoid pressurized-center valve 430.

Figure 11A:
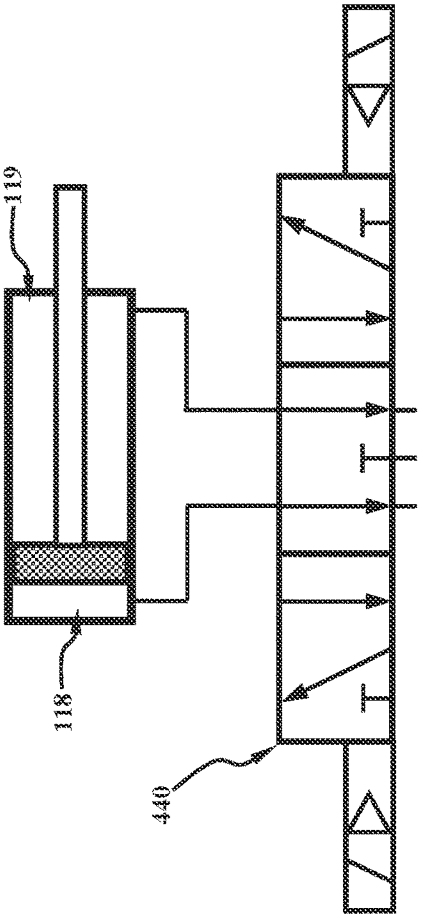
Fig. 11A (Prior Art)
FIG. 11A is a diagram of an example of a prior art 5-way 3-position double-solenoid center-exhaust actuator system.

Referring to FIG. 11A, an actuator incorporating a 5-way 3-position double-solenoid exhaust-center valve 440 is illustrated. When valve 440 is in its right position compressed air flows into the left cylinder section 118 and compressed air is exhausted from the right cylinder section 119 and the piston moves to the right. When valve 440 is in its center position (as shown in FIG. 11A) both the right and the left cylinder sections become exhausted and the piston 106 is substantially allowed to move freely when a longitudinal force is applied to the piston rod. When valve 440 is in its left position, compressed air flows into the right cylinder section 119 and compressed air is exhausted from the left cylinder section 118 and the piston moves to the left.

Figure 11B:
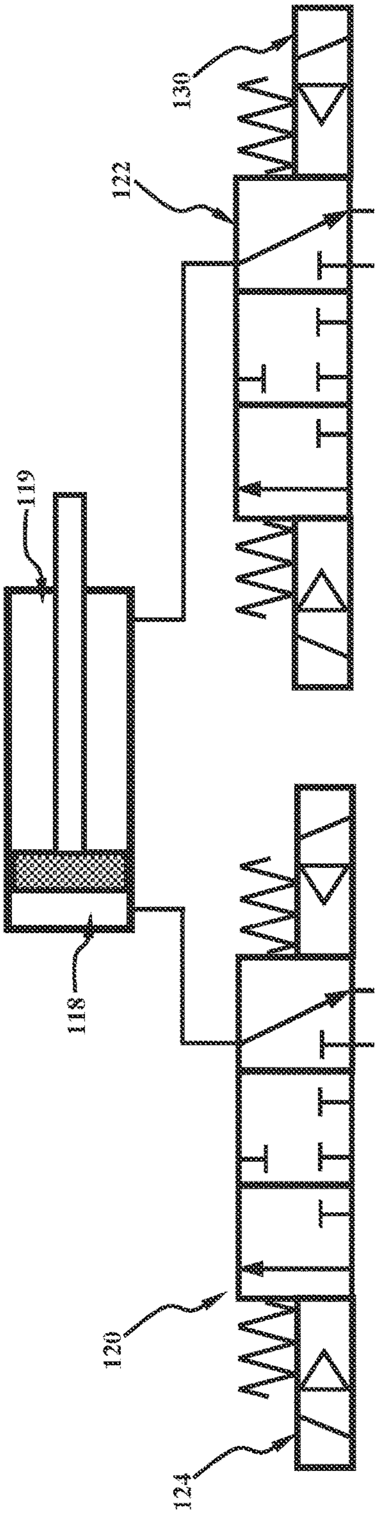
FIG. 11B is a diagram of yet another additional example of an implementation of an actuator system with universal valves.

Referring to FIG. 11B, an example of how a pair of universal valves 120 and 122 can be used to implement the function of the 5-way 3-position double-solenoid exhaust-center valve of FIG. 11A is illustrated. These configurations of air-flow into or out of the cylinder can be accomplished with universal valves 120 and 122 configured as shown in FIG. 11B. When the universal valve 120 is in its right-most position and the universal valve 122 is in its left-most position, compressed air flows into the left cylinder section 118 and compressed air is exhausted from the right cylinder section 119 and the piston moves to the right. When the universal valve 120 is in its left-most position and the universal valve 122 also is in its left-most position (as shown in FIG. 11B), any compressed air in the left cylinder section 118 and the right cylinder section 119 will be exhausted to the atmosphere and the piston 106 is substantially allowed to move freely when a longitudinal force is applied to the piston rod. When the universal valve 120 is in its left position and when the universal valve 122 is in its right position, compressed air flows into the right cylinder 119 section and compressed air is exhausted from the left cylinder section 118 and the piston moves to the left. Thus valves 120 and 122 can be positioned to accomplish the functionality of a 5-way 3-position double-solenoid exhaust-center valve 440.

Since the universal valves 120 and 122 as illustrated in FIGS. 7B, 8B, 9B, 10B, and 11B are all substantially identical, the universal valves 120 and 120 as configured in these illustrations are truly universal as they can be operated by way of example to perform the function of an actuator incorporating a 5-way 2-position single-solenoid spring return valve 400 as shown in FIG. 7A, a 5-way 2-position double solenoid valve 410 as shown in FIG. 8A, a 5-way 3-position blocked center double solenoid valve 420 as shown in FIG. 9A, a 5-way 3-position pressurized center double solenoid valve 430 as shown in FIG. 10A, or a 5-way 3-position center-exhaust double solenoid valve 440 as shown in FIG. 11A.

In the examples above, the universal controller 140 or universal controllers 240A and 240B have been described to this point as being coupled to a pair of universal valves 120 and 122 that are then used to control the flow of compressed air into or out of a cylinder 104 to effect a change in position of a piston 106 as illustrated by way of example in FIGS. 2, 4, and 6.

Figure 12:
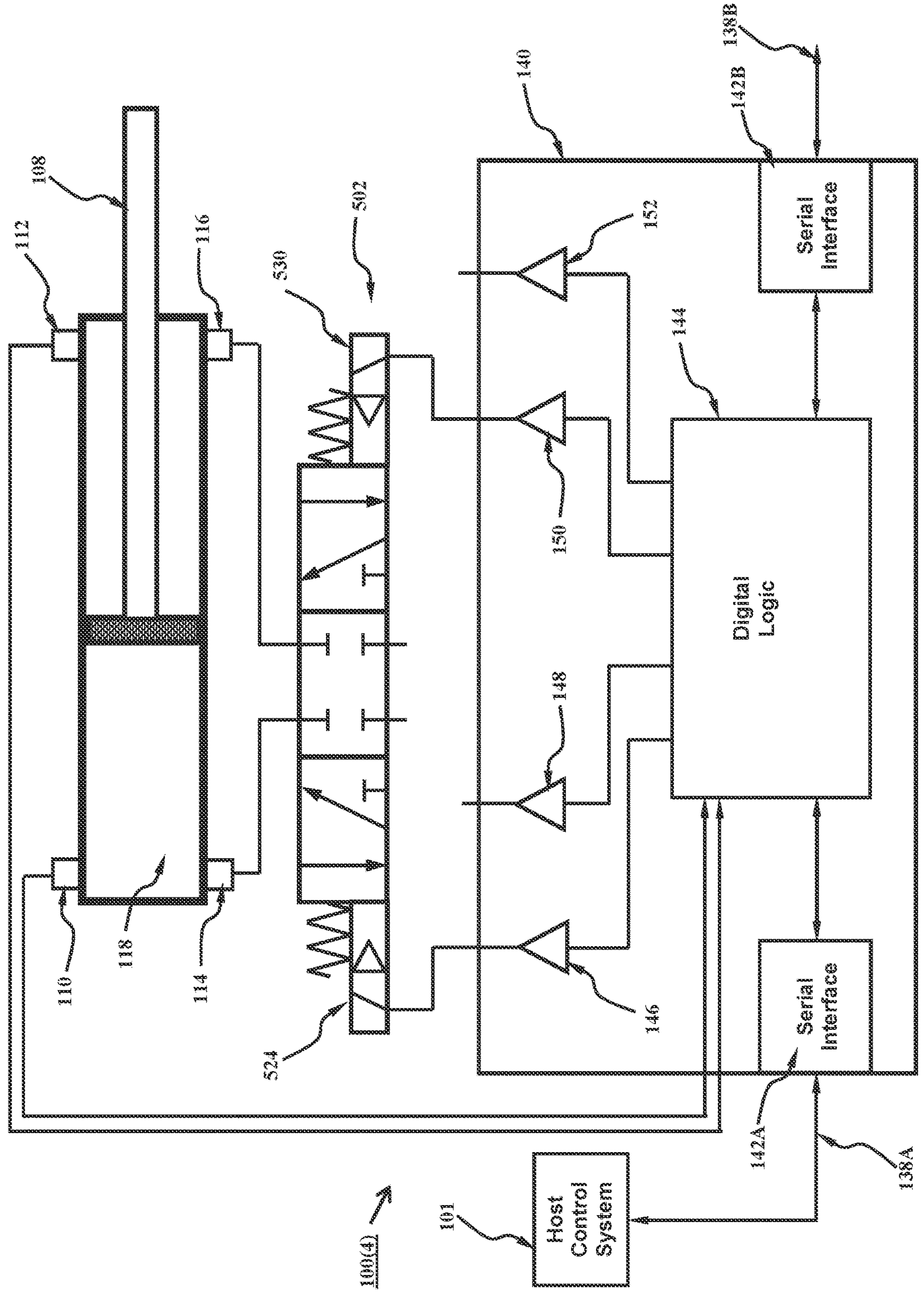
FIG. 12 is a diagram illustrating the use of universal valve controlling circuitry for controlling a prior art valve in an actuator system.

Referring to FIG. 12, another example of a directional control valve system 100(4) is illustrated. The directional control valve system 100(4) is the same in structure and operation as the directional control valve system 100(1), except as otherwise illustrated and described herein. Elements in directional control valve system 100(4) which are like those in directional control valve system 100(1) will have like reference numerals.

In this example, a directional control valve system 100(4) with the universal controller 140 also can be used to control a prior-art valve 502. In this case an output of the solenoid driver 146 of universal controller 140 is coupled to the solenoid 524 of prior art valve 530 and an output of the solenoid driver 150 of universal controller 140 is coupled to the solenoid 530 of prior art valve. Note that this configuration retains the advantages provided by the previous examples, such as the Learn Mode and the daisy-chain communications by way of example, except for the fact that the two universal valves 120 and 122 are now replaced with a single prior-art valve 530 which cannot be located at both the ports 114 and 116. This complicates the system layout and design, which drives up the design costs, increases the assembly time and costs, and also increases operation costs somewhat because more compressed air will be needed to pressurize the air line associated with the port 114 and/or the port 116 (whichever one(s) do not have the valve prior-art 530 mounted onto it).

Accordingly, as illustrated and described by way of the examples herein, this technology significantly improves including lower design costs, lower assembly costs, and lower operating costs due to its improved design and more efficient use of compressed air.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims.

What is claimed is:

1. An actuator system comprising:

two or more matching universal valves each comprising a body that houses sections comprising a one way fill valve section, a center block valve section, and a one way exhaust valve section and three ports, wherein one of the two or more universal valves is coupled to one section of the actuator and another one of the two or more universal valves is coupled to another section of the actuator;

a one or more sensors;

at least one driver system coupled to control movement in each of the universal valves between the fill valve section, the block valve section, and the exhaust valve section;

a controller coupled to the one or more sensors and the at least one drive system, the controller comprising one or more processors coupled to a memory comprising a learning algorithm configured to generate characterization data over a number of cycles of retractions and extractions of a piston in which a continuous position of the piston is sensed and tracked in time to learn how long the one way fill valve section, the center block valve section, and the one way exhaust valve section of each of the universal valves must be in a particular position to effect a given movement of a piston and minimize a total amount of fluid used to effect the movement, wherein the processors are configured to be capable of executing programmed instructions stored in the memory comprising the programmed instructions to:

access the characterization data that identifies a first switch time prior to reaching a fully advance position and a second switch time prior to reaching a fully retracted position that minimize the total amount of the fluid used to effect an actuation;

move one of the universal valves so the one way fill valve section of the one of the universal valves is in a fill valve position to initiate an input flow of the fluid and move another one of the universal valves so the one way exhaust valve section of the another one of the universal valves is in an exhaust valve position to initiate an exhaust flow of the fluid until the first switch time prior to reaching a fully advance position has been reached based on the characterization data;

move the one of the universal valves so the center block valve section of the one of the universal valves is in a block valve position that stops the input flow of the fluid and move the another one of the universal valves so the center block valve section of the another one of the universal valves is in a block valve position that stops the exhaust flow of the fluid when the first switch time prior to reaching a fully advance position has been reached based on the characterization data; and move the one of the universal valves so the one way exhaust valve section of the one of the universal valves is in an exhaust valve position to initiate an exhaust flow of the fluid to reverse direction and move the another one of the universal valves so the one way exhaust valve section of the another one of the universal valves is in a to the fill valve position to initiate an input flow of additional fluid until the second switch time prior to reaching a fully retracted position has been reached based on the characterization data.

2. The system as set forth in claim 1, wherein the at least one driver system comprises solenoids coupled to each of the two or more universal valves to move the body.

3. A method of making an actuator system, the method comprising:

providing two or more matching universal valves each comprising a body that houses sections comprising a one way fill valve section, a center block valve section, and a one way exhaust valve section and three ports, wherein one of the two or more of the universal valves is coupled to one section of the actuator and another one of the two or more of the universal valves is coupled to another section of the actuator;

providing a one or more sensors;

coupling at least one driver system to control movement in each of the universal valves between the fill valve section, the block valve section, and the exhaust valve section;

coupling a controller to the one or more sensors and the at least one drive system, the controller comprising one or more processors coupled to a memory comprising a learning algorithm configured to generate characterization data over a number of cycles of retractions and extractions of a piston in which a continuous position of the piston is sensed and tracked in time to learn how long the one way fill valve section, the center block valve section, and the one way exhaust valve section of each of the universal valves must be in a particular position to effect a given movement of a piston and minimize a total amount of fluid used to effect the movement, wherein the processors are configured to be capable of executing programmed instructions stored in the memory comprising providing commands to:

access the characterization data that identifies a first switch time prior to reaching a fully advance position and a second switch time prior to reaching a fully retracted position that minimize the total amount of the fluid used to effect an actuation;

move one of the universal valves so the one way fill valve section of the one of the universal valves is in a fill valve position to initiate an input flow of the fluid and move another one of the universal valves so the one way exhaust valve section of the another one of the universal valves is in an exhaust valve position to initiate an exhaust flow of the fluid until the first switch time prior to reaching a fully advance position has been reached based on the characterization data;

move the one of the universal valves so the center block valve section of the one of the universal valves is in a block valve position that stops the input flow of the fluid and move the another one of the universal valves so the center block valve section of the another one of the universal valves is in a block valve position that stops the exhaust flow of the fluid when the first switch time prior to reaching a fully advance position has been reached based on the characterization data; and move the one of the universal valves so the one way exhaust valve section of the one of the universal valves is in an exhaust valve position to initiate an exhaust flow of the fluid to reverse direction and move the another one of the universal valves so the one way exhaust valve section of the another one of the universal valves is in a to the fill valve position to initiate an input flow of additional fluid until the second switch time prior to reaching a fully retracted position has been reached based on the characterization data.

4. The method as set forth in claim 3, wherein the coupling at least one driver system further comprises coupling solenoids to each of the universal valves to move the body.

* * * * *